United States Patent
Takahashi

(10) Patent No.: US 8,190,349 B2
(45) Date of Patent: May 29, 2012

(54) CONTROL DEVICE OF INTERNAL COMBUSTION ENGINE

(75) Inventor: Masashi Takahashi, Obu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/805,791

(22) Filed: Aug. 19, 2010

(65) Prior Publication Data

US 2011/0066353 A1 Mar. 17, 2011

(30) Foreign Application Priority Data

Sep. 11, 2009 (JP) ............................. P.2009-210863

(51) Int. Cl.
*F02D 41/14* (2006.01)
*F02D 28/00* (2006.01)
*F01N 3/00* (2006.01)

(52) U.S. Cl. .......... 701/111; 701/103; 701/102; 12/672; 12/689; 60/285

(58) Field of Classification Search .................. 701/111, 701/102, 103–105, 115; 123/672, 685, 686, 123/689, 694; 60/274, 276, 285, 294
See application file for complete search history.

(56) References Cited

U.S. PATENT DOCUMENTS

| | | | | |
|---|---|---|---|---|
| 5,501,074 A | * | 3/1996 | Suetsugu et al. | 60/285 |
| 5,515,826 A | * | 5/1996 | Hamburg et al. | 123/672 |
| 5,598,703 A | * | 2/1997 | Hamburg et al. | 60/274 |

FOREIGN PATENT DOCUMENTS

| | | | |
|---|---|---|---|
| JP | 62-132253 U | | 8/1987 |
| JP | 06273366 A | * | 9/1994 |
| JP | 2757698 B2 | | 3/1998 |
| JP | 11-280518 | | 10/1999 |
| JP | 2002-364414 A | | 12/2002 |
| JP | 2004-245191 A | | 9/2004 |

* cited by examiner

*Primary Examiner* — Hieu T Vo
(74) *Attorney, Agent, or Firm* — Birch, Stewart, Kolasch & Birch, LLP

(57) ABSTRACT

A control device of an internal combustion engine includes: an air-fuel ratio modulator, performing modulation of an air-fuel ratio of an exhaust which flows in an exhaust purifier provided in an exhaust system of the internal combustion engine; a fluctuation detector, detecting a fluctuation of the internal combustion engine due to the modulation of the air-fuel ratio performed by the air-fuel ratio modulator; a feed-back controller, performing feed-back control of a driving control parameter of the internal combustion engine so as to suppress the fluctuation detected by the fluctuation detector; a determiner, determining whether or not a driving state of the internal combustion engine is in an operating area of the feed-back controller; and an operator, setting a fluctuation suppression target value, which is a target value for suppressing the fluctuation of the internal combustion engine, to operate the feed-back controller based on the fluctuation suppression target value, when the determiner determines that the driving state of the internal combustion engine is not in the operating area of the feed-back controller, while the air-fuel modulator performs the modulation of the air-fuel ratio.

11 Claims, 11 Drawing Sheets

CONTROL DEVICE OF INTERNAL COMBUSTION ENGINE

BACKGROUND OF THE INVENTION

The present invention relates to a control device of an internal combustion engine.

In an exhaust system of an internal combustion engine which is mounted on a vehicle, an exhaust purification unit for removing CO (carbon monoxide), HC (hydrocarbon), $NO_x$ (nitrogen oxide), and particulate matter (PM), which are contained in the exhaust of the internal combustion engine, is provided.

In a case where the internal combustion engine is a gasoline engine, a three-way catalyst is widely used as the exhaust purification unit.

The three-way catalyst is a catalyst that oxidizes CO to $CO_2$, oxidizes HC to $CO_2$ and $H_2O$ and reduces $NO_x$ to $O_2$ (oxygen) and $N_2$ (nitrogen).

Furthermore, in a case where the internal combustion engine is a diesel engine, as the exhaust purification unit, the following are used in combination. That is, there are an oxidation catalyst, a $NO_x$ storage catalyst, and a diesel particulate filter (DPF).

The oxidation catalyst oxidizes CO and HC to $CO_2$ (carbon dioxide) and $H_2O$ (water).

The $NO_x$ storage catalyst discharges $NO_x$ to reduce it to $N_2$ and $CO_2$ and remove the same by temporarily trapping the $NO_x$ of the exhaust to make the exhaust a reduction atmosphere.

The diesel particulate filter collects and removes the particulate matters contained in the exhaust.

In the above-mentioned gasoline engine, in order to perform an activation processing which activates the three-way catalyst, in other words, in order to raise the temperature of the three-way catalyst to improve the reactivity as the catalyst, a control, which temporarily modulates the air-fuel ratio to supply a partial unburned gas (hereinafter, simply called an unburned gas) to the three-way catalyst, is performed.

As described above, compulsorily modulating the air-fuel ratio is called a compulsory modulation. In addition, temporarily and compulsorily modulating the air-fuel ratio to be rich (a rich air-fuel ratio) is called a rich spike.

More specifically, the unburned gas supplied by modulating the air-fuel ratio is oxidized (burned) with the three-way catalyst to raise the temperature of the three-way catalyst, thereby activating the three-way catalyst.

Furthermore, in the above-mentioned diesel engine, in order to perform the reproduction processing of the exhaust purification unit, that is, the $NO_x$ reduction processing and the self purge of the $NO_x$ storage catalyst and the reproduction processing of the diesel particulate filter, a control for compulsorily modulating the air-fuel ratio in the same manner as described above is performed.

More specifically, the $NO_x$ reduction processing (a rich purge) is performed by modulating the air-fuel ratio to supply the unburned gas (a reducing agent) to the $NO_x$ storage catalyst.

In addition, the temperature of the exhaust is raised by about 600° C. by modulating the air-fuel ratio to oxidize (burned) the unburned gas with the oxidation catalyst or the $NO_x$ storage catalyst. In addition, the particulate matters converged in the diesel particulate filter are burned by supplying the diesel particulate filter with the exhaust with the temperature raised, whereby the reproduction processing of the diesel particulate filter is performed.

As described above, when the air-fuel ratio is temporarily and compulsorily modulated and changes, a fluctuation (fluctuation of the revolution or fluctuation of the torque) of the internal combustion engine (hereinafter, called an engine) occurs.

However, when a vehicle is driven at a certain speed (a normal driving) and when an engine is in an idle state, a feed back control of a driving control parameter of the engine functions so that the revolutions of the engine are constantly maintained.

Specifically, in the case of the diesel engine, the feed-back control of the ignition timing or the throttle opening degree as the driving control parameter functions.

In the case of the gasoline engine, the feed back control of the fuel injection amount as the driving control parameter functions.

Thus, even when the air-fuel ratio temporarily increases, a fluctuation in revolution of the engine and a fluctuation in torque are suppressed.

On the other hand, when the vehicle is accelerated, since the driving control parameter of the engine is subjected to a feed-forward control corresponding to an accelerator operation by a driver, the feed-back control does not function.

For this reason, for example, when the air-fuel ratio is temporarily modulated to be rich at the time of acceleration, it is difficult to avoid the generation of the fluctuation in the engine.

Furthermore, there is proposed a technique which suppresses the fluctuation in torque due to a temporary richness of the air-fuel ratio by delaying the ignition timing of the engine (see JP-A-2002-364414).

However, the above-mentioned technique can be applied to cases where the vehicle is normally driven or the engine is in the idle state, but it cannot be applied at the time of acceleration.

That is, when the feed-back control of the driving control parameter such as at the time of acceleration of the vehicle does not function and only the feed-forward control is performed, performing the compulsory modulation of the air-fuel ratio at the time of acceleration generates the fluctuation in engine and becomes a cause of deteriorated drivability.

As a result, the compulsory modulation of the air-fuel ratio is performed only when the drivability is given priority and the feed-back control of the driving control parameter functions, namely, when the vehicle is in the idle state.

However, when a situation where the compulsory modulation of the air-fuel ratio can be performed is restricted, it is disadvantageous in securing a processing that should be performed with respect to the exhaust purification unit, i.e., an implementation frequency of the activation processing of the exhaust purification unit.

SUMMARY

It is therefore an object of the invention to provide a control device of an internal combustion engine which is advantageous in securing an implementation frequency of an activation processing or a reproduction processing of an exhaust purification unit without deteriorating the drivability.

In order to achieve the object, according to the invention, there is provided a control device of an internal combustion engine comprising:

an air-fuel ratio modulator, performing modulation of an air-fuel ratio of an exhaust which flows in an exhaust purifier provided in an exhaust system of the internal combustion engine;

a fluctuation detector, detecting a fluctuation of the internal combustion engine due to the modulation of the air-fuel ratio performed by the air-fuel ratio modulator;

a feed-back controller, performing feed-back control of a driving control parameter of the internal combustion engine so as to suppress the fluctuation detected by the fluctuation detector;

a determiner, determining whether or not a driving state of the internal combustion engine is in an operating area of the feed-back controller; and an operator, setting a fluctuation suppression target value, which is a target value for suppressing the fluctuation of the internal combustion engine, to operate the feed-back controller based on the fluctuation suppression target value, when the determiner determines that the driving state of the internal combustion engine is not in the operating area of the feed-back controller, while the air-fuel modulator performs the modulation of the air-fuel ratio.

The operator may detect a target revolution of the internal combustion engine as the fluctuation suppression target value based on a motion equation which sets a crank angular speed or a crank angular acceleration of the internal combustion engine as an unknown function, and operate the feed-back controller so as to make an actual revolution close to the target revolution.

The fluctuation detector may include a revolution detector detecting an actual revolution of the internal combustion engine, and the operator may detect a target revolution of the internal combustion engine as the fluctuation suppression target value based on least squares method which uses detection result by the revolution detector, and operate the feed-back controller so as to make the actual revolution close to the target revolution.

Furthermore, as the rotation detector, for example, a crank angle sensor, a cam angle sensor or the like can be used. A component which can detect an actual torque of the internal combustion engine (and a vehicle having the same), e.g., a torque sensor can be used without being limited to that which detects the actual revolution of the internal combustion engine such as a revolution detector. In this case, the actual torque is detected as the actual revolution and a target torque is detected as an object revolution.

The feed-back controller may set an ignition timing of the internal combustion engine to be the driving control parameter, and the operator may adjust the ignition timing so as to reduce a deviation between a target revolution of the internal combustion engine and an actual revolution of the internal combustion engine.

The adjustment of the ignition timing is substantially effective in the case in which (the target revolution)<(the actual revolution). In this case, if (the target revolution)<(the actual revolution), to the extent that the value which results from subtracting the target revolution from the actual revolution is large, the ignition timing is greatly retarded to reduce the actual revolution (torque) of the internal combustion engine.

In addition, if the basic ignition timing is set to be closer to the retarded than the optimum value, the adjustment of the ignition timing is also applied to the case of (the target revolution)>(the actual revolution). In this case, if (the target revolution)<(the actual revolution), the ignition timing is retarded to lower the actual revolution, and if (the target revolution)>(the actual revolution), the ignition timing is advanced to raise the actual revolution.

The feed-back controller may set a throttle opening degree of a throttle valve of the internal combustion engine to be the driving control parameter, and the operator may adjust the throttle opening degree so as to reduce a deviation between a target revolution of the internal combustion engine and an actual revolution of the internal combustion engine.

In this case, if (the target revolution)<(the actual revolution), the adjustment of the throttle opening degree is controlled so that the opening degree is further decreased to lower the actual revolution. Furthermore, if (the target revolution)>(the actual revolution), the adjustment of the throttle opening degree is controlled so that the opening degree is further increased to raise the actual revolution.

The feed-back controller may set a fuel injection amount of the internal combustion engine to be the driving control parameter, and the operator may adjust the fuel injection amount so as to reduce a deviation between a target revolution of the internal combustion engine and an actual revolution of the internal combustion engine.

In this case, if (the target revolution)<(the actual revolution), the adjustment of the fuel injection amount is controlled so that the injection amount is further decreased to lower the actual revolution. Furthermore, if (the target revolution)>(the actual revolution), the adjustment of the fuel injection amount is controlled so that the injection amount is further increased to raise the actual revolution.

The feed-back controller may set a fuel injection timing of the internal combustion engine to be the driving control parameter, and the operator may adjust the fuel injection timing so as to reduce a deviation between a target revolution of the internal combustion engine and an actual revolution of the internal combustion engine.

In this case, if (the target revolution)<(the actual revolution), the adjustment of the fuel injection timing is performed so that the injection timing is retarded to lower the actual revolution. Furthermore, if (the target revolution)>(the actual revolution), the adjustment of the fuel injection timing is performed so that the injection timing is advanced to raise the actual revolution.

The control device of the internal combustion may further include a motor, applying a positive torque or a negative torque to the internal combustion engine, the feed-back controller may set a revolution of the motor to be the driving control parameter, and the operator may adjust the revolution of the motor so as to reduce a deviation between a target revolution of the internal combustion engine and an actual revolution of the internal combustion engine.

In this case, if (the target revolution)<(the actual revolution), the adjustment of the revolution of the motor is controlled so that the revolution of the motor is decreased to lower the actual revolution. Furthermore, if (the target revolution)>(the actual revolution), the adjustment of the revolution of the motor is controlled so that the revolution of the motor is increased to raise the actual revolution.

Additionally, the "motor" includes an electric motor which is a power source of a hybrid vehicle together with the internal combustion engine, a generator which can also be operated as the motor among alternators as a vehicle electric load, a normal alternator as the vehicle electric load, or the like. However, since the normal alternator cannot impart a positive torque to the internal combustion engine, it can be substantially applied to the case of (the target revolution)<(the actual revolution).

When the internal combustion engine is in an acceleration driving state, the determiner may determine that the driving state of the internal combustion engine is not in the operating area of the feed-back controller.

When the internal combustion engine is in a normal driving state after acceleration, the determiner may determine that the driving state of the internal combustion engine is not in the operating area of the feed-back controller.

When the internal combustion engine is in a normal driving state after deceleration, the determiner may determine that the driving state of the internal combustion engine is not in the operating area of the feed-back controller.

DETAILED DESCRIPTION OF EMBODIMENTS

First Embodiment

Next, a control device of an internal combustion engine of an embodiment of the present invention will be described with reference to FIGS. 1 to 5.

First of all, an engine (an internal combustion engine) 10 to which a control device 100 of the present invention is applied will be described.

Figure 1:
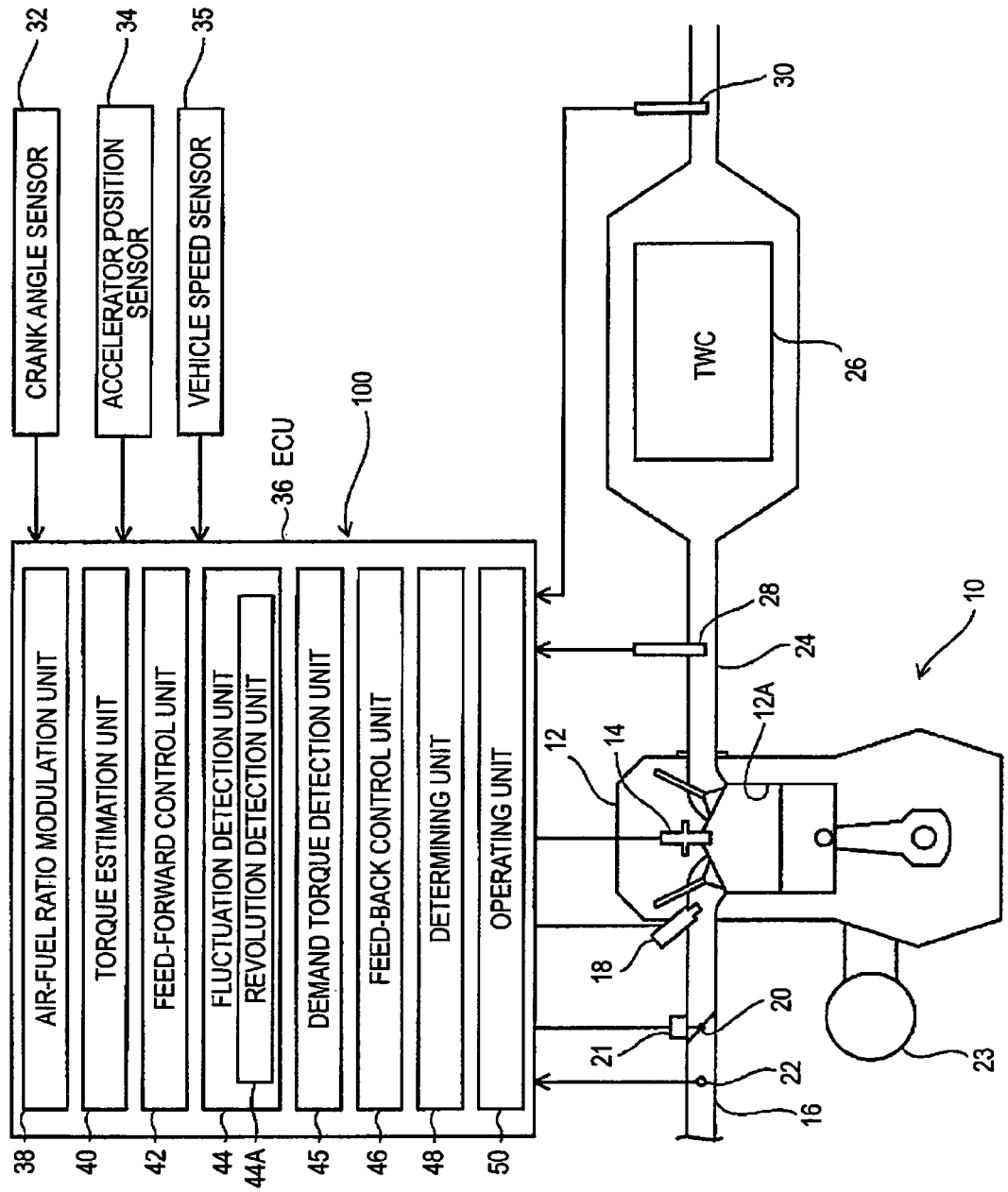
FIG. 1 is a diagram showing a configuration of an engine on which a control device of an internal combustion engine relating to the present invention is provided.

As shown in FIG. 1, in the present embodiment, the engine 10 mounted on a vehicle is a gasoline engine.

The engine 10 is an intake flow path injection type and includes a cylinder head 12, an ignition plug 14, an intake flow path 16, a fuel injection valve 18, a throttle valve 20, an air flow sensor 22, a motor (an alternator or a generator) 23 or the like.

In addition, the engine 10 includes an exhaust flow path 24, a three-way catalyst 26, an upstream side oxygen sensor 28, a downstream side oxygen sensor 30, a crank angle sensor 32, an accelerator position sensor 34, a vehicle speed sensor 35, an ECU 36, and the control device 100 according to the present invention.

The cylinder head 12 forms a combustion chamber (a cylinder chamber) 12A in which a mixed gas is burned.

The intake flow path 16 communicates with the combustion chamber 12A to supply the combustion chamber 12A with the air.

The throttle valve 20 is provided on the intake flow path 16 and includes an actuator 21.

The throttle valve 20 is configured such that the actuator 21 is driven by the control of the ECU 36, whereby an opening degree thereof is adjusted to adjust the intake air amount which is sucked into the combustion chamber via the intake flow path 16 through the adjustment of the opening degree.

The air flow sensor 22 is provided on the intake flow path 16 and detects the intake air amount, which is actually sucked into the combustion chamber 12A via the intake flow path 16, to supply the detection information to the ECU 36.

The fuel injection valve 18 is provided on the intake flow path 16 and is connected to a fuel supplying device having a fuel tank (not shown) via a fuel pipe. The fuel supplying device has a fuel pump which injects the fuel from the fuel injection valve 18 via the intake flow path 16 into the combustion chamber 12A by supplying the fuel within the fuel tank to the fuel injection valve 18.

The fuel injection valve 18 controls the injection timing and the injection amount of the fuel by the ECU 36.

The ignition plug 14 is provided on the combustion chamber 12A to burn the mixed gas within the combustion chamber 12A by igniting the fuel at the ignition timing which is decided by the control of the ECU 36.

The exhaust flow path 24 leads and discharges the exhaust, which is generated by the combustion of the mixed gas in the combustion chamber 12A, to the outside of the vehicle.

The three-way catalyst 26 purifies the exhaust to be discharged from the engine 10 and is provided on the exhaust flow path 24 (an exhaust system).

The three-way catalyst 26 is a catalyst for purifying the exhaust by oxidizing CO contained in the exhaust to $CO_2$, oxidizing HC to $CO_2$ and $H_2O$, and reducing $NO_x$ to $O_2$ (oxygen) and $N_2$ (nitrogen).

The three-way catalyst 26 exhibits a function of purifying the exhaust by being activated.

The activation of the three-way catalyst 26 is performed by generating CO, HC and $O_2$ which are unburned gases by temporarily making the air-fuel ratio of the exhaust rich to oxidize (burn) the same with the three-way catalyst 26, thereby raising the temperature of the three-way catalyst 26.

The upstream side oxygen sensor 28 is provided on the upstream side of the three-way catalyst 26 on the exhaust flow path 24 to detect the oxygen amount in the exhaust of the exhaust in the vicinity of the inlet of the three-way catalyst 26 and supply the detection information to the ECU 36.

That is to say, the upstream side oxygen sensor 28 detects the air-fuel ratio of the exhaust before being purified by the three-way catalyst 26.

The downstream side oxygen sensor 30 is provided on the downstream side of the three-way catalyst 26 among the exhaust flow path 24 to detect the oxygen amount in the exhaust of the exhaust path in the vicinity of the outlet of the three-way catalyst 26 and supply the detection information to the ECU 36.

In other words, the downstream side oxygen sensor 30 detects the air-fuel ratio of the exhaust after being purified by the three-way catalyst 26.

In order to detect the air-fuel ratio, a wide area air-fuel ratio sensor for directly detecting the air-fuel ratio can be used in addition to the upstream side oxygen sensor 28 and the downstream side oxygen sensor 30.

The crank angle sensor 32 detects the crank angle to supply the detection information to the ECU 36.

The accelerator position sensor 34 detects the operation amount of the accelerator pedal to supply the detection information to the ECU 36.

The vehicle speed sensor 35 detects the running speed of the vehicle to supply the detection information to the ECU 36.

The ECU (Electronic Control Unit) 36 is an electronic control unit that performs the control of the engine 10.

The ECU 36 includes a CPU, a ROM that stores the control program etc., a RAM that provides a working area, a microcomputer to which an interface portion etc. forming an interface with the surrounding circuit is connected by a pass. In addition, the CPU functions by executing the control program.

Furthermore, the above-mentioned air flow sensor 22, the upstream side oxygen sensor 28, the downstream side oxygen sensor 30, the crank angle sensor 32, the accelerator position sensor 34, and various sensors (not shown) are connected to the input side of the ECU 36, and the detection information from the various sensors is input into the input side of the ECU 36.

Moreover, the above-mentioned ignition plug 14, the fuel injection valve 18 and various output devices (not shown) are connected to the output side of the ECU 36.

The CPU executes the control program, so that the ECU 36 controls the ignition plug 14, the fuel injection valve 18, and the various output devices based on the detection information from the sensors 22, 28, 30, 32 and 34, whereby the engine 10 is controlled.

That is, the ECU 36 calculates the fuel injection amount, the fuel injection timing, the ignition timing or the like based on the detection information from the air flow sensor 22, the upstream side oxygen sensor 28, the downstream side oxygen sensor 30, the crank angle sensor 32, the accelerator position sensor 34, and the vehicle speed sensor 35. In addition, the ECU 36 controls the ignition plug 14 and the fuel injection valve 18 based on the calculation results.

As a result, a suitable amount of fuel is injected from the fuel injection valve 18 at a suitable timing and a flame ignition is performed by the ignition plug 14 at a suitable timing.

In addition, the CPU executes the control program, so that the ECU 36 functions as an air-fuel ratio modulation unit 38, a torque estimation unit 40, a feed-forward control unit 42, a fluctuation detection unit 44, a desired torque detection unit 45, a feed-back control unit 46, a determining unit 48, and an operating unit 50.

In addition, the control device 100 of the internal combustion engine includes the air-fuel ratio modulation unit 38, the fluctuation detection unit 44, the desired torque detection unit 45, the feed-back control unit 46, the determining unit 48, and the operating unit 50.

The air-fuel ratio modulation unit 38 modulates the air-fuel ratio of the exhaust flowing in the three-way catalyst 26.

In the present embodiment, the air-fuel ratio modulation unit 38 controls the air-fuel ratio of the engine 10 by controlling the injection amount and the injection timing of the fuel by the fuel injection valve 18.

In the present embodiment, the air-fuel ratio modulation unit 38 maintains the air-fuel ratio of the engine 10 to be stoichiometric at the usual time.

Moreover, when there is a need to supply the unburned gas with respect to the three-way catalyst 26, a compulsory modulation, which compulsorily modulates the air-fuel ratio of the engine 10, is performed.

Furthermore, in the present embodiment, in order to promote the simplification of the description, a case of performing the rich spike for intermittently making the air-fuel ratio of the engine 10 rich will be described.

The unburned gas is supplied to the three-way catalyst 26 by performing the rich spike (the compulsory modulation), and the unburned gas is oxidized (burned) with the three-way catalyst 26, so that the temperature increases, whereby the reactivity of the three-way catalyst 26 rises and the three-way catalyst 26 is activated.

In addition, the air-fuel ratio is maintained to be stoichiometric by the air-fuel ratio modulation unit 38, whereby the purification of the exhaust by the three-way catalyst 26 is satisfactorily performed.

The torque estimation unit 40 estimates the torque fluctuation amount which is the torque amount of the engine 10 to be changed by the compulsory modulation.

The estimation of the torque fluctuation amount by the torque estimation unit 40 is, for example, performed as follows:

That is, the relationship of the air-fuel ratio and the torque amount of the engine 10 is set as a map by a pretest.

In addition, a difference between the torque amount, which corresponds to the air-fuel ratio at the time of pre-stoichiometric and the air-fuel ratio calculated from the torque amount map of the engine 10, and the torque amount, which corresponds to the air-fuel ratio at the time of rich (at the time of compulsory modulation) and the air-fuel ratio calculated from the torque amount map of the engine 10, is estimated as the torque fluctuation amount.

The feed-forward control unit 42 performs the feed-forward control of the driving control parameter of the engine 10 so as to suppress the torque fluctuation amount estimated with the torque estimation unit 40.

Herein, the driving control parameter is a parameter relating to the combustion of the engine 10. In the present embodiment, the driving control parameter is the ignition timing.

Thus, the feed-forward control unit 42 calculates the retardation amount of the ignition timing of the ignition plug 14, which is necessary for suppressing the torque fluctuation amount of the engine 10, to retard the ignition timing based on the calculated retardation amount.

That is, the feed-forward control unit 42 controls the ignition timing based on the crank angle detected by the crank angle sensor 32 and the calculated retardation amount to suppress the torque fluctuation amount of the engine 10.

When the engine 10 idles, in the normal driving state, the fluctuation in torque at the time of rich spike (at the time of compulsory modulation) is suppressed by the feed-forward control of the ignition timing of the engine 10 by the feed-forward control unit 42.

In addition, the driving control parameter which performs the feed-forward control with the feed-forward control unit 42, in the case of the gasoline engine, may use the throttle opening degree of the throttle valve 20 as the driving control parameter without being limited to the ignition timing.

The fluctuation detection unit 44 detects the fluctuation of the engine 10 due to the modulation of the air-fuel ratio by the air-fuel ratio modulation unit 38.

In the present embodiment, the fluctuation detection unit 44 detects the fluctuation of the engine 10 as a fluctuation in engine revolution.

The fluctuation detection unit 44 has a revolution detection unit 44A for detecting the actual revolution of the engine 10.

The revolution detection unit 44A detects the actual revolution of the engine 10 by calculating the crank angle to be detected by the crank angle sensor 32.

Furthermore, the fluctuation of the engine 10 which is detected by the fluctuation detection unit 44 may be a fluctuation in torque of the engine 10.

The demand torque detection unit 45 detects the required demand torque by the operation of the accelerator pedal by the driver who drives and operates the vehicle.

That is, the relationship between the operation amount of the accelerator pedal, which is detected with the accelerator position sensor 34, and the demand torque amount is set as the map. In addition, the demand torque detection unit 45 detects the demand torque by reading the demand torque amount, which corresponds to the operation amount of the accelerator pedal to be detected with the accelerator position sensor 34, from the map.

The feed-back control unit 46 performs the feed-back control of the driving control parameter of the engine 10 so as to suppress the fluctuation of the engine 10 detected with the fluctuation detection unit 44.

In the present embodiment, the feed-back control unit 46 sets the ignition timing as the driving control parameter of the engine 10.

Thus, the feed-back control unit 46 calculates the retardation amount of the ignition timing of the ignition plug 14, which is necessary for suppressing the fluctuation amount of the revolution of the engine 10 detected with the fluctuation detection unit 44, to retard the ignition timing based on the calculated retardation amount.

That is, the feed-back control unit 46 performs the feed-back control of the ignition timing.

When the engine 10 is in the idle driving state, the fluctuation of the engine 10 at the time of compulsory modulation of the air-fuel ratio is suppressed by the feed-back control of the ignition timing of the engine 10 by the above-mentioned feed-back control unit 46.

In other words, when the engine 10 is in the idle driving state, the driving state of the engine 10 is in the operating area of the feed-back control unit 46.

The determining unit 48 determines whether or not the driving state of the engine 10 is in the operating area of the feed-back control unit 46 based on the establishment of a prescribed condition, that is, whether or not the feed-back control of the driving control parameter by the feed-back control unit 46 is executed.

In addition, the driving state of the engine 10 which is not in the operating area of the feed-back control unit 46 refers, for example, to an acceleration driving state and a normal driving state after acceleration and deceleration, generally, a driving state which is not in the idle state. In the present embodiment, the above-mentioned prescribed condition is such that the operation amount of the accelerator pedal detected with the accelerator position sensor 34 is zero (the accelerator pedal is not operated) and the vehicle speed of the vehicle detected with the vehicle speed sensor 35 is zero.

That is, when the prescribed condition is established, it is determined that the driving state of the engine 10 is in the operating area of the feed-back control unit 46, and when the prescribed condition is not established, it is determined that the driving state of the engine 10 is not in the operating area of the feed-back control unit 46.

The operating unit 50 performs the following operation when the determining unit 48 determines that the driving state of the engine 10 is not in the operating area of the feed-back control unit 46 during execution of the modulation of the air-fuel ratio by the air-fuel ratio modulation unit 38.

That is, the operating unit 50 sets a fluctuation suppression target value which is a target value for suppressing the fluctuation of the engine 10 to operate the feed-back control unit 46 based on the fluctuation suppression target value.

In the present embodiment, the operating unit 50 sets a target engine revolution as a fluctuation suppression target value to operate the feed-back control unit 46 so as to reduce a deviation of the target engine revolution and the actual engine revolution based on the fluctuation suppression target value.

In addition, in the present embodiment, the operating unit 50 detects the target revolution of the engine 10 as the fluctuation suppression target value based on a motion equation, in which the crank angular speed of the engine 10 is set to be an unknown function, to operate the feed-back control unit 46 so as to make the actual revolution close to the target revolution.

Specifically, the operating unit 50 detects the target revolution of the engine 10 as the fluctuation suppression target value based on a motion equation in which the crank angular speed of the engine 10 using the detection result of the revolution detection unit 44A and the demand torque detection unit 45 is set to be an unknown function. In addition, the operating unit 50 operates the feed-back control unit 46 so as to make the actual revolution close to the target revolution:

The operating unit 50 detects the target revolution of the engine 10 as the fluctuation suppression target value with the following procedure.

In the present embodiment, the motion equation corresponding to the dynamic model of the engine 10 is defined as follows:

First of all, the dynamic model of the engine 10 has a rotating output shaft, and a flywheel is provided on the output shaft so as to be rotated integrally therewith.

The motion equation corresponding to the dynamic model is defined as equation (1).

$$J(d\omega/dt) + C\omega = Tq \tag{1}$$

Herein, J is a moment of inertia (a mass of the flywheel), $\omega$ is an angular speed, C is a viscous resistance, and Tq is a demand torque (a torque through which the flywheel rotates).

Herein, since the output shaft corresponds to the crank shaft, the angular speed $\omega$ corresponds to the crank angular speed.

Thus, the equation (1) is the motion equation in which the crank angular speed $\omega$ of the engine 10 is set to be the unknown function.

The operating unit 50 can detect the target revolution of the engine 10 as the fluctuation suppression target value by solving the equation (1) in regard to the crank angular speed $\omega$.

Herein, to solve the equation (1), the initial value of the crank angular speed $\omega$ and the demand torque Tq are required.

The initial value of the crank angular speed $\omega$ can be obtained based on the actual revolution of the engine 10. The actual revolution of the engine 10 uses the value detected with the revolution detection unit 44A.

The demand torque Tq uses the value detected with the demand torque detection unit 45.

Furthermore, the motion equation may set the crank angular acceleration as the unknown function instead of the crank angular speed $\omega$.

Additionally, in the present embodiment, the description has been given of the case where the motion equation sets the crank angular speed $\omega$ of the engine 10 using the torque Tq, which is the detection result of the demand torque detection unit 45, as the unknown function.

However, the motion equation is not limited to the above-mentioned form, for example, since the motion equation using the demand energy instead of the torque Tq can be established, the demand torque detection unit 45 is not essential.

The description will be given with reference to FIG. 2.

Figure 2:
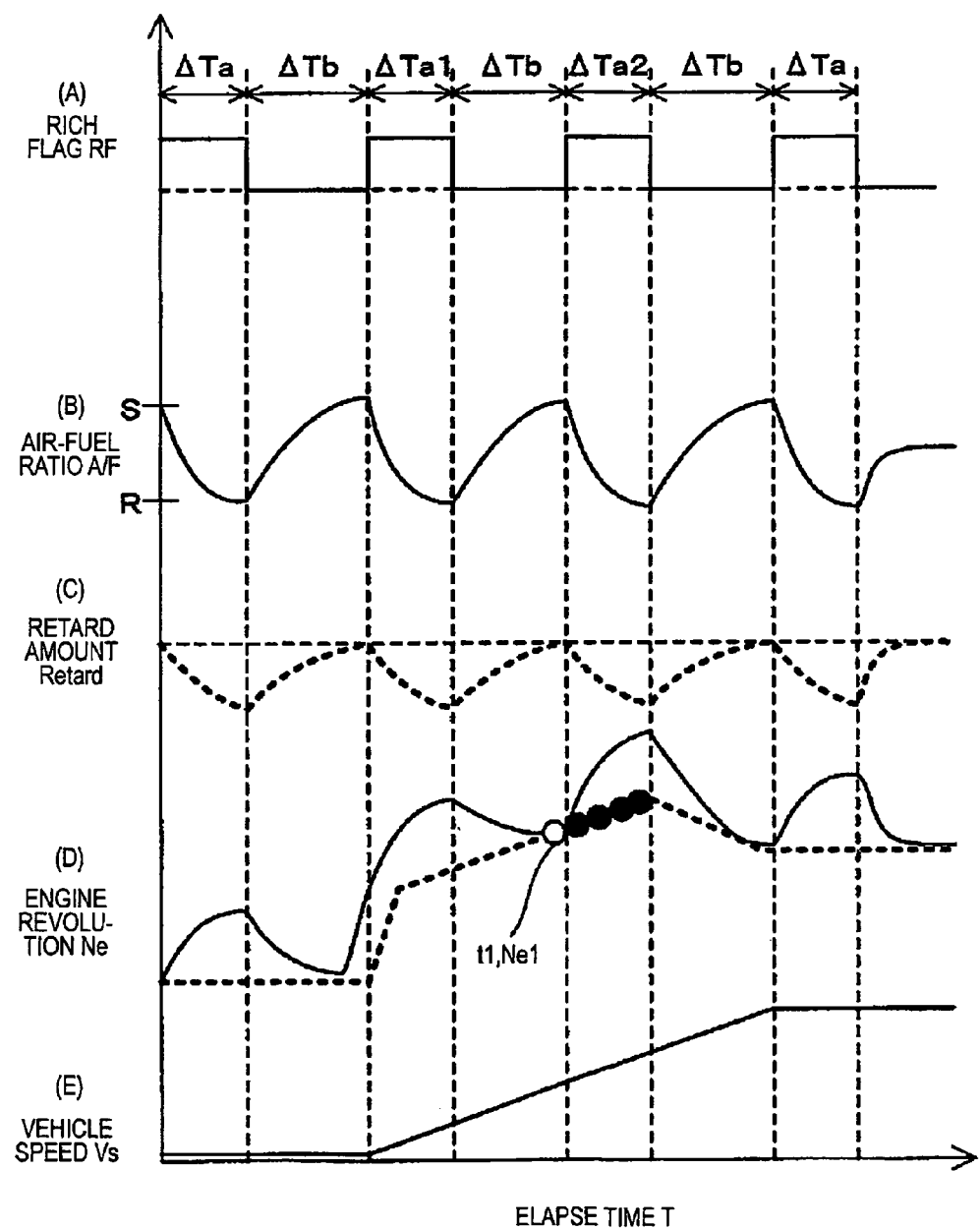
FIG. 2 is a wave form diagram showing an operation of a control device in a case where a rich spike is performed in a first embodiment.

FIG. 2 is a wave form diagram showing the operation of the control device 100 when the rich spike of the air-fuel ratio by the air-fuel ratio modulation unit 38 is performed.

(A) of FIG. 2 shows a rich flag RF which shows the implementation and the non-implementation of the rich spike by the air-fuel ratio modulation unit 38.

(B) of FIG. 2 shows the air-fuel ratio A/F of the exhaust of the engine 10.

(C) of FIG. 2 shows the ignition timing, which is controlled by the feed-forward control by the feed-forward control unit 42, as a retardation amount Retard (deg).

(D) of FIG. 2 shows the engine revolution Ne (rpm) which is detected by the revolution detection unit 44A, namely, the actual revolution.

The solid line shows the actual revolution Ne in a comparison example to which the present invention is not applied, and the dotted line shows the actual revolution Ne in the case to which the present invention is applied.

(E) of FIG. 2 shows the vehicle speed Vs (km/h) which is detected by the vehicle speed sensor 35.

In the present embodiment, a process, in which the vehicle normally runs from the idle driving state via the acceleration state at a certain vehicle speed, is shown.

As shown in (A) of FIG. 2, a period between a rich spike performing period ΔTa1 performed at the time of acceleration of the engine 10 and the next rich spike period ΔTa2 is set to a rich spike rest period ΔTb.

That is, as shown in (D) of FIG. 2, the actual revolution Ne is the maximum at the finish point of the rich spike performing period ΔTa, that is, at the start point of the rich spike rest period ΔTb, and drops as it reaches the finish point of the rich spike rest period ΔTb.

In addition, the variation rate (slope) of the actual revolution Ne due to the passing of time is also a negative large value immediately after the start of the rich spike rest period ΔTb. On the contrary, the variation ratio drops as it reaches the finish point of the rich spike rest period ΔTb and is converged to the value of zero.

The operating unit 50 calculates and sets the target revolution of the engine 10 as the fluctuation suppression target value by solving the equation (1) in regard to the crank angular speed ω based on one actual revolution Ne1, which has been detected in the process in which the variation rate of the actual revolution Ne is uniformly converged, and the demand torque Tq, at the time point t1 immediately before the rich spike rest period ΔTb is finished.

At this time, in the target revolution determined on the basis of the one actual revolution Ne1 and the demand torque Tq, a change with respect to the detected one actual revolution is moderated.

Thus, in the target revolution determined by the operating unit 50, the variation rate with respect to the actual revolution, which has been detected immediately before the rich spike rest period ΔTb is finished, is suppressed.

Furthermore, in the example of FIG. 2, in order to simplify the illustration, an operation of performing the determination of the target revolution by the operating unit 50 is shown as being performed only once. However, in fact, the operation of performing the determination of the target revolution by the operating unit 50 is repeatedly performed in a period when the vehicle is accelerating.

The operating unit 50 operates the feed-back control unit 46 so as to make the actual revolution close to the target revolution set as described above.

Specifically, the operating unit 50 performs the feed-back control of the ignition timing so that the deviation between the actual revolution of the engine 10 detected with the revolution detection unit 44A and the target revolution set with the operating unit 50 decreases.

In other words, the operating unit 50 greatly retards the ignition timing as the deviation of the target revolution and the actual revolution increases to operate the feed-back control unit 46.

That is, after the rich spike period ΔTa2 following the rich spike rest period ΔTb in the non-idle driving state, the engine 10 is controlled as follows:

Namely, the revolution of the engine 10 is controlled on the basis of the target revolution as the fluctuation suppression target value in which the variation rate with respect to the actual revolution, which has been detected immediately before the rich spike rest period ΔTb is finished, is suppressed.

Figure 3:
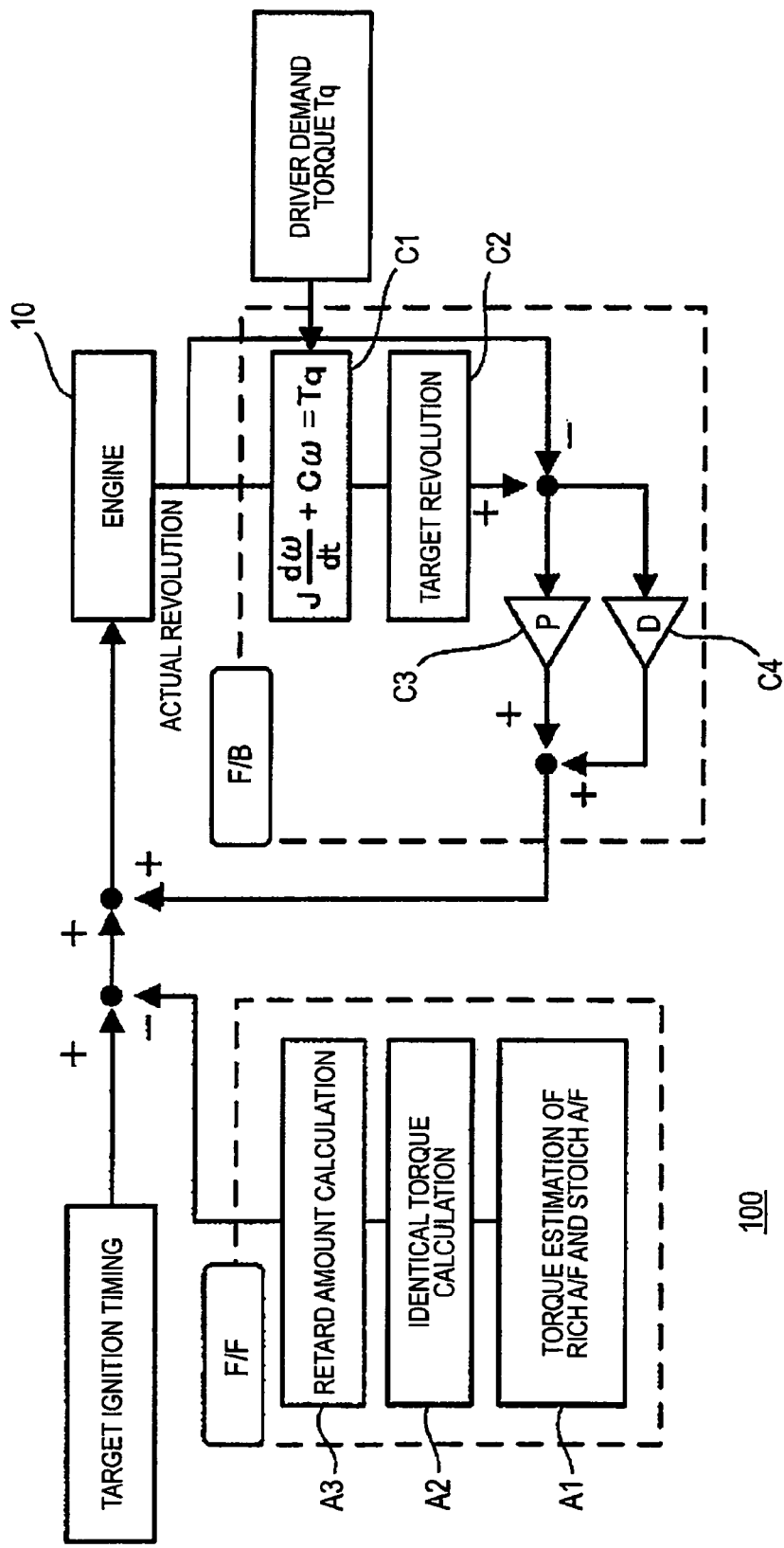
FIG. 3 is a diagram illustrating an operation in which a control element of the control device in the first embodiment is a main agent.

Next, the control operations of the feed-forward control unit 42 and the feed-back control unit 46 will be described with reference to FIG. 3.

The ECU 36 decides the target ignition timing by the existing control.

Specifically, the relationship of the engine revolution, the air amount and the target ignition timing is set as the map in advance. In addition, the ECU 36 reads out the target ignition timing from the map based on the detection information corresponding to the engine revolution which is supplied from the crank angle sensor 32 and the detection information corresponding to the air amount which is supplied from the air flow sensor 22.

The torque estimation unit 40 reads out and estimates the torque amount of the engine 10 at the time of stoichiometric and the torque amount of the engine 10 at the time of rich spike from the map (step A1).

Next, the torque estimation unit 40 calculates the minus torque amount necessary for removing the torque fluctuation amount of the engine 10 which increases due to the rich spike, i.e., the identical torque amount (step A2).

In other words, the torque estimation unit 40 estimates the torque amount of the engine 10, which increases due to the rich spike, as the torque fluctuation amount.

Next, the feed-forward control unit 42 calculates the retardation amount corresponding to the identical torque amount (step A3).

The calculated retardation amount is added as the negative value with respect to the target ignition timing. As a result, the torque amount of the engine 10 is reduced to be the identical torque amount. Thus, the feed-forward control is implemented so that the torque fluctuation amount of the engine 10 which increases due to the rich spike is suppressed.

When the determining unit 48 determines that the driving state of the engine 10 is not in the operating area of the feed-back control unit 46, the operating unit 50 solves the motion equation of the equation (1) in regard to the crank angular speed ω based on the one actual revolution detected with the actual revolution detection unit 44 and the demand torque Tq, immediately before the rich spike rest period ΔTb is finished (step C1). In addition, the target revolution is set as the fluctuation suppression target value based on the solved crank angular speed ω (step C2).

The target revolution determined in the step C2 is subjected to the feed-back control using a proportional operation (step C3) and a differential operation (step C4).

As a result, the revolution of the engine 10 is controlled based on the target revolution as the fluctuation suppression target value in which the variation rate relative to the actual revolution is suppressed.

Next, the description will be given to the torque fluctuation suppressing processing when the three-way catalyst 26 is subjected to the activation processing by the control device 100, with reference to the flow chart shown in FIG. 4.

Figure 4:
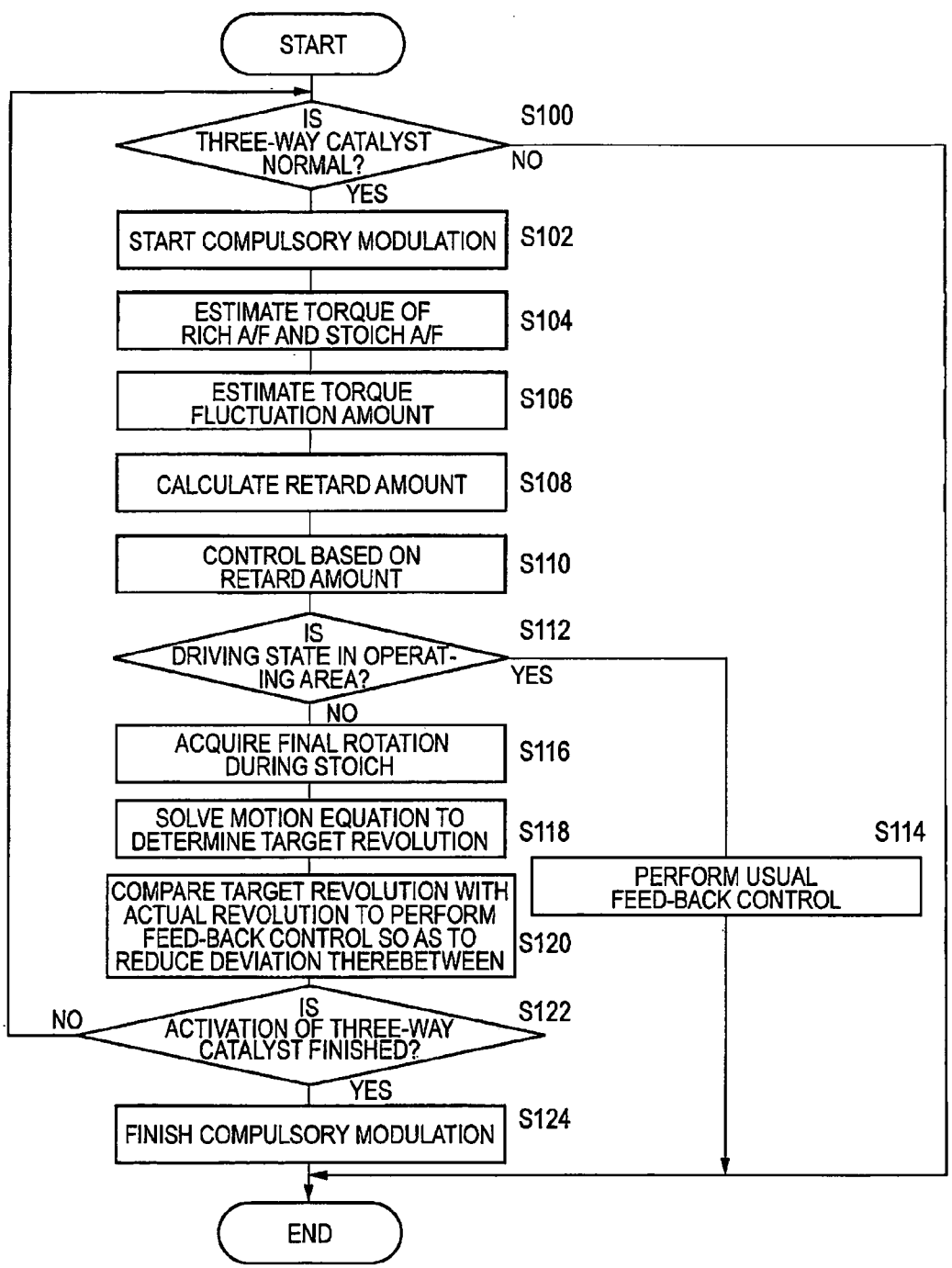
FIG. 4 is a flow chart that shows a torque fluctuation suppressing processing when a three-way catalyst is subjected to an activation processing by the control device in the first embodiment.

A need to activate the three-way catalyst 26 is generated, whereby the operation of FIG. 4 starts.

First of all, the ECU 36 decided whether or not the three-way catalyst 26 is normal based on the detection information of the upstream side oxygen sensor 28 and the downstream side oxygen sensor 30 (step S100).

If the step S100 is negative, the ECU 36 skips the processing after step S102 to perform a report display for reporting the abnormality of three-way catalyst 26 to the driver.

If the step S100 is positive, the air-fuel ratio modulation unit 38 implements the compulsory modulation of the air-fuel ratio. That is, the air-fuel ratio modulation unit 38 starts the rich spike (step S102).

Next, the torque estimation unit 40 estimates the torque during rich and the torque during stoichiometric (step S104).

In addition, the torque estimation unit 40 estimates the torque fluctuation amount during rich based on the torque during estimated rich and the torque during stoichiometric (step S106).

In addition, the feed-forward control unit 42 calculates the retardation amount based on the torque fluctuation amount (step S108), retards the ignition timing of the engine 10 based on the retardation amount (step S110), and performs the feed-forward control of the ignition timing of the engine 10 (step S110).

As a result, the torque fluctuation is suppressed during idling of the engine 10.

Next, the determining unit 48 determines whether or not the driving state of the engine 10 is in the operating area of the feed-back control unit 46 (step S112).

If the step S112 is positive, the operating unit 50 performs the next control.

That is, the ignition timing is subjected to the feed-back control so that the deviation becomes zero based on the deviation of the engine revolution Ne, which is detected by the revolution detection unit 44A, and the target revolution (step S114). That is, a normal feed-back control, which mates the engine revolution with the target revolution is performed, thereby finishing a series of processes.

As a result, when the engine 10 is in the operating area of the feed-back control unit 46, the fluctuation in revolution of the engine 10 during rich spike is suppressed.

If the step S112 is negative, as shown in (D) of FIG. 2, the operating unit 50 acquires one actual revolution which is detected by the revolution detection unit 44, immediately before the rich spike rest period ΔTb is finished (step S116). In other words, the operating unit 50 acquires the final actual revolution during stoichiometric.

Next, the operating unit 50 solves the motion equation of equation (1) in regard to the crank angular speed ω, and determines the target revolution as the fluctuation suppression target value based on the solved crank angular speed ω (step S118). More specifically, the operating unit 50 calculates and determines the target revolution as shown by black points in (D) of FIG. 2.

The operating unit 50 performs the feed-back control of the ignition timing so that the deviation of the actual revolution of the engine 10 and the target revolution are decreased by the feed-back control unit 46 (step S120).

Next, the ECU 36 determines whether or not the activation of the three-way catalyst 26 is finished (step S122).

Furthermore, the decision of whether or not the activation of the three-way catalyst 26 is finished, for example, can be performed based on whether or not the measured time reaches a prescribed predetermined time by measuring the rich spike implementation period ΔTa.

If the step S122 is negative, the process returns to the step S100, and if the step S122 is positive, the implementation of the compulsory modulation is finished (step S124) to finish a series of processes.

Figure 5:
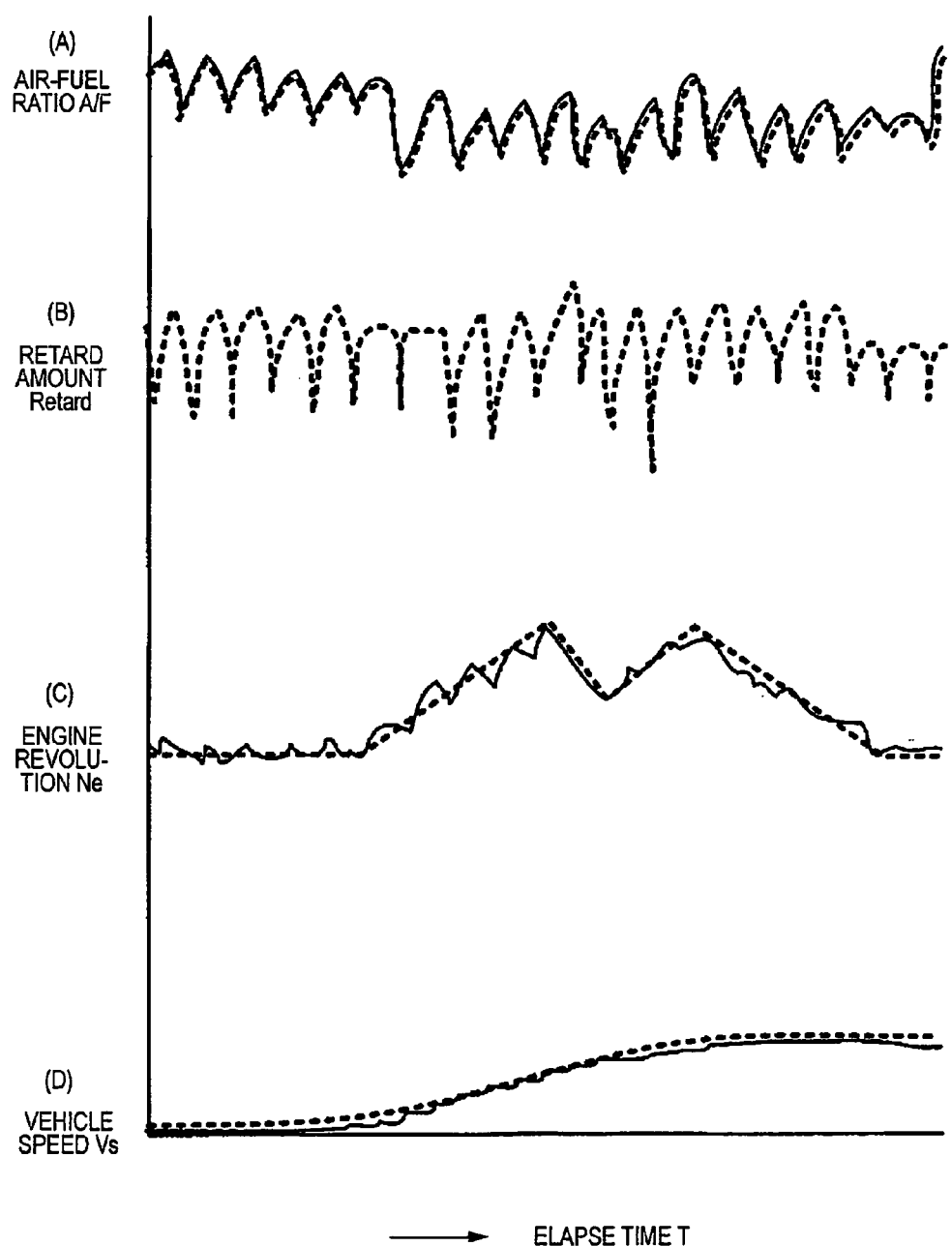
FIG. 5 is a wave form diagram showing test results of the control device of the first embodiment.

FIG. 5 is a wave form diagram showing the test results of the control device 100 of the present embodiment. In the drawings, dotted lines show the measurement results of the control device 100 of the present embodiment, and solid lines show the measurement results of the comparison example which does not use the control device 100 of the present embodiment.

FIG. 5 shows the measurement values in the case of performing the rich spike in the process in which the vehicle is accelerated from the stop state to reach the normal driving.

(A) of FIG. 5 shows an air-fuel ratio A/F.
(B) of FIG. 5 shows a retardation angle Retard.
(C) of FIG. 5 shows an engine revolution Ne.
(D) of FIG. 5 shows a running speed Vs of the vehicle.

As is apparent from FIG. 5, in the comparison example, a fluctuation in engine revolution Ne is generated no matter whether in any period of idling (during vehicle stop), acceleration, or normal driving, and particularly, a fluctuation in engine revolution Ne during acceleration is the largest.

That is, in the comparison example, a decline in drivability is remarkable.

On the contrary, when using the control device 100 of the present embodiment, a fluctuation in engine revolution Ne is suppressed no matter whether in any period of idling (during the vehicle stop), acceleration or normal driving.

In particular, the fluctuation in engine revolution Ne during acceleration is effectively suppressed as compared to the comparison example. Thus, it is advantageous in securing the drivability during acceleration.

According to the first embodiment, during modulation of the air-fuel ratio, when it is determined that the driving state of the engine 10 is not in the operating area of the feed-back control unit 46, a fluctuation suppression target value, which is a target value for suppressing the fluctuation of the engine 10, is set to operate the feed-back control unit 46 based on the fluctuation suppression target value.

For this reason, since the fluctuation of the engine 10 is effectively suppressed, it is advantageous in performing the modulation of the air-fuel ratio without deteriorating the drivability of the vehicle.

Furthermore, when the activation processing of the three-way catalyst 26 is implemented during acceleration of the vehicle, since the exhaust temperature is high, the catalyst temperature of the three-way catalyst 26 can rapidly increase. For this reason, the three-way catalyst 26 can be activated in a short time, which is advantageous in improving the exhaust purification efficiency.

Particularly, in the first embodiment, the target revolution can be obtained by solving the motion equation in regard to the crank angular speed ω. For this reason, it is advantageous in improving a response property of the control with respect to the accelerator pedal operation of the driver and improving the robustness of the control.

Second Embodiment

Next, a second embodiment of the present invention will be described with reference to FIGS. 6 to 8. Furthermore, a configuration of the control device 100 is described by the use of FIG. 1.

Furthermore, in the following embodiment, the parts, which are identical to or correspond to the first embodiment, will be noted by the same reference numerals and the description thereof will be omitted.

In the second embodiment, since the operating unit 50 is different from that of the first embodiment and other configurations are the same as those of the first embodiment, hereinafter, the description will focus on the operating unit 50.

The operating unit 50 detects the revolution of the engine 10 as the fluctuation suppression target value based on least squares method using the detection result of the revolution detection unit 44A and operates the feed-back control unit 46 so as to make the actual revolution close to the target revolution.

The wave forms of the respective parts in the control device 100 and the operation of the operating unit 50 will be described with reference to FIG. 6. Furthermore, in FIG. 6, the description of the same parts as those of FIG. 2 will be omitted.

In the second embodiment, the operating unit 50 determines the fluctuation suppression target value by the least squares method based on a plurality of actual revolutions which are detected with the revolution detection unit 44A, immediately before the rich spike rest period ΔTb is finished.

Figure 6:
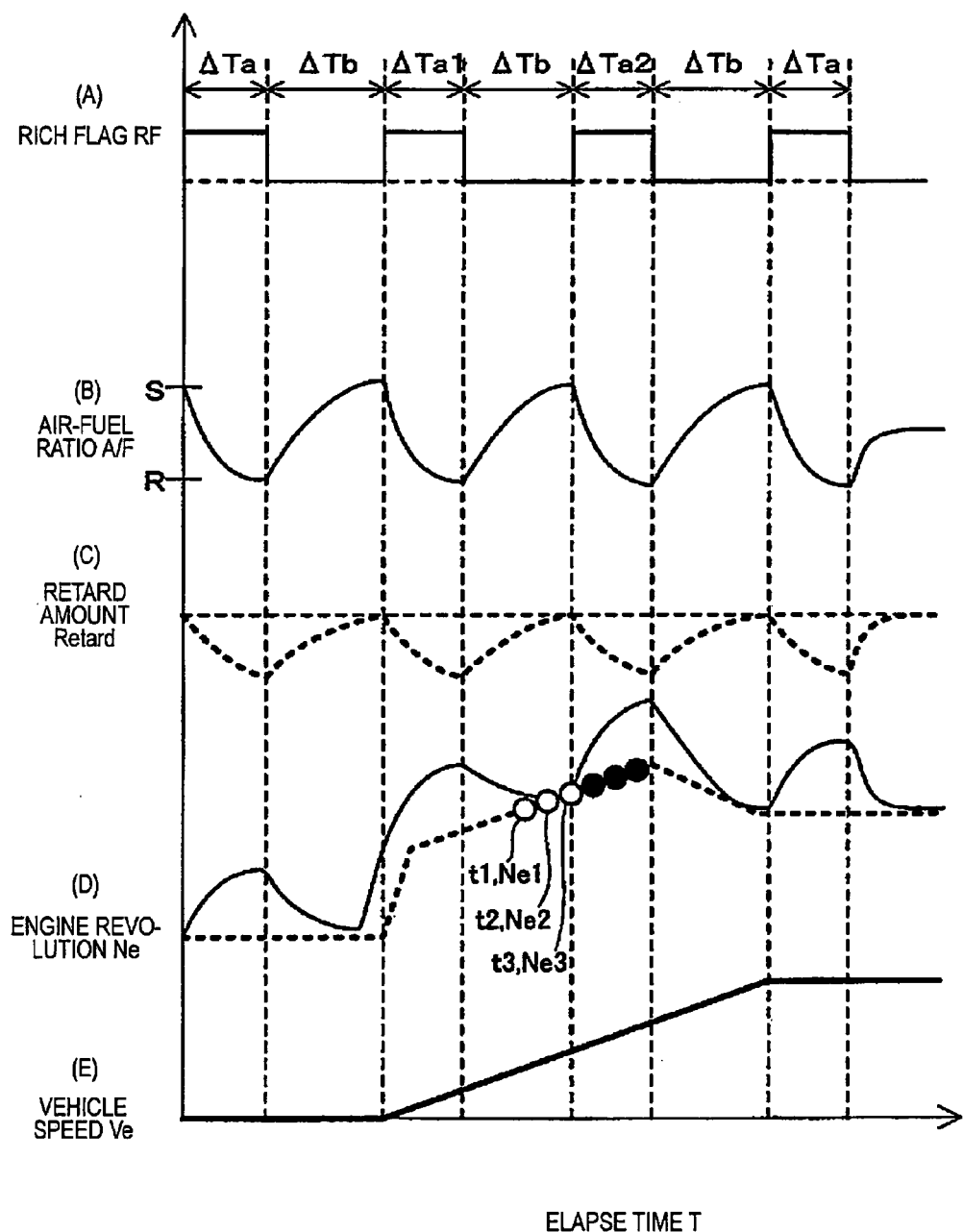
FIG. 6 is a wave form diagram showing an operation of a control device in a case where a rich spike is performed in a second embodiment.
Figure 7:
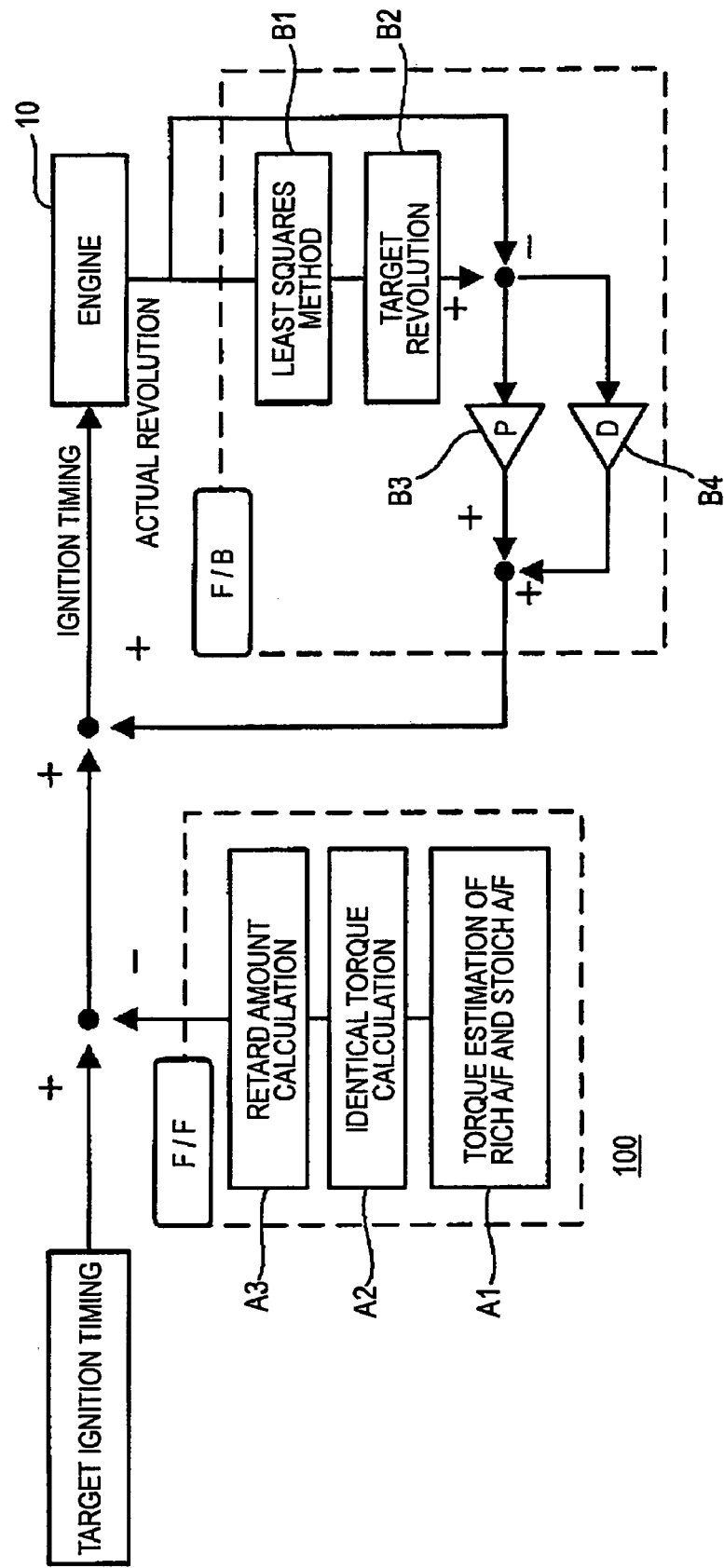
FIG. 7 is a diagram illustrating operations in which a control element of the control device in the second embodiment is a main agent.

That is, as shown in (D) of FIG. 6, the operating unit 50 determines the target revolution by the least squares method based on the three actual revolutions Ne1, Ne2 and Ne3 which have been sampled (detected) at a certain period by the revolution detection unit 44A.

More specifically, the operating unit 50 determines the target revolution by the least squares method based on the three actual revolutions Ne1, Ne2 and Ne3 which have been detected at time points t1, t2 and t3 (t1<t2<t3).

As shown in (D) of FIG. 6, the actual revolution Ne is highest at the finish time point of the rich spike implementation period ΔTa, i.e., at the start time point of the rich spike rest period ΔTb, and decreases as it reaches the finish time point of the rich spike rest period ΔTb.

In addition, the variation rate (slope) due to the passing of time of the actual revolution Ne also decreases as it reaches the finish time point of the rich spike rest period ΔTb and is converged to the value of zero, compared to that which the variation rate is the negative large value immediately after the start time point of the rich spike rest period ΔTb. In other words, the actual revolution Ne is stabilized.

Thus, a change in target revolution as the fluctuation suppression target value, which has been determined by the least squares method based on the plurality of actual revolutions detected immediately before the rich spike rest period ΔTb is finished, is alleviated with respect to the plurality of detected actual revolutions.

Furthermore, the least squares method is a method of determining a coefficient of an approximate expression so that the sum of the square value of a difference between the plurality of detection values and the corresponding values of the approximate expressions corresponding to the plurality of detection values becomes the minimum, when the plurality of detected detection values is approximated by the use of a specific approximate expression (function) such as a linear function.

That is, in the present embodiment, the plurality of detected actual revolutions is approximated with the approximate expression including the linear function. At that time, the coefficient of the approximate expression is determined so the sum of the square value of the difference of the plurality of actual revolutions and the target revolution, which is the corresponding value of the approximate expression corresponding to the plurality of actual revolutions, is the minimum.

Thus, the target revolution determined by the operating unit 50 is that in which the variation rate corresponding to the actual revolution detected immediately before the rich spike rest period ΔTb is finished is suppressed.

In addition, since the target revolution is determined based only on the plurality of actual revolutions using the least squares method, it is advantageous in promoting the simplification of the processing when determining the target revolution.

Next, the control operations of the feed-forward control unit 42 and the feed-back control unit 46 will be described with reference to FIG. 7.

The ECU 36 determines the target ignition timing by the existing control.

The control operation by the feed-forward control unit 42 is the same as the first embodiment.

When it is determined that the driving state of the engine 10 is not in the operating area of the feed-back control unit 46 by the determining unit 48, the operating unit 50 sets the target revolution as the fluctuation suppression target value based on the least squares method using the plurality of actual revolution which is detected with the revolution detection unit 44A, immediately before the rich spike rest period ΔTb is finished (steps B1 and B2).

The target revolution set in the step B2 is subjected to the feed-back control using the proportional operation (step B3) and the differential operation (step B4).

As a result, revolution of the engine 10 is controlled based on the target revolution as the fluctuation suppression target value in which the variation rate in regard to the actual revolution is suppressed.

Next, the torque fluctuation suppressing processing at the time of activation processing of the three-way catalyst 26 by the control device 100 will be described with reference to the flow chart shown in FIG. 8.

Figure 8:
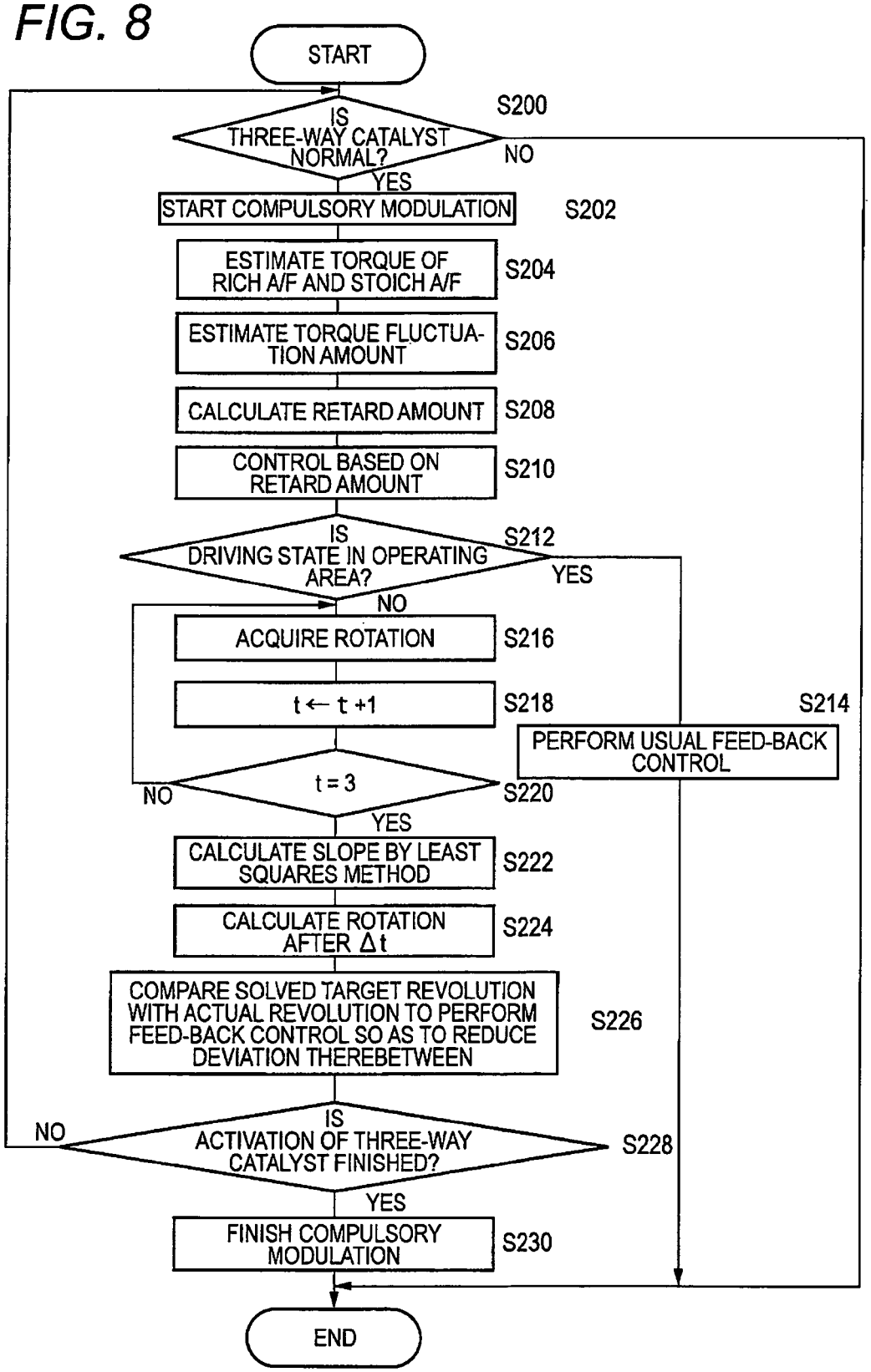
FIG. 8 is a flow chart that shows a torque fluctuation suppressing processing when a three-way catalyst is subjected to an activation processing by the control device in the second embodiment.

Furthermore, since steps S200 to S214 of FIG. 8 are the same as the steps S100 to S114 of FIG. 4, the description thereof will be omitted, and the description will be given from step S216.

If the step S214 is negative, the operating unit 50 acquires a plurality of actual revolutions which is detected with the revolution detection unit 44A immediately before the rich spike rest period ΔTb is finished.

In the present embodiment, as shown in (D) of FIG. 6, the operating unit 50 acquires the three actual revolutions Ne1, Ne2 and Ne1 of the time points t1, t2 and t3 (steps S216, S218 and S220).

Next, the operating unit 50 approximates the three actual revolutions Ne1, Ne2 and Ne3 with the approximate expression (the least squares method) including the linear function, in other words, calculates the slope of the approximate expression (step S222).

In addition, the operating unit 50 calculates and determines the target revolution as the fluctuation suppression target value based on the approximate expression solved in the step S222 (step S224). More specifically, as shown by the black points in (D) of FIG. 6, the operating unit 50 calculates and determines the target revolution at the regular time Δt intervals.

The operating unit 50 causes the feed-back control unit 46 to feed-back control the ignition timing so that the deviation of the actual revolution and the target revolution of the engine 10 decreases (step S226).

Next, the ECU 36 determines whether or not the activation of the three-way catalyst 26 is finished (step S228).

If the step S228 is negative, the process returns to the step S200, and if the step S228 is positive, the implantation of the compulsory modulation is finished (step S230) to finish a series of processes.

Even in the control device 100 of the second embodiment, in the same manner as the first embodiment, during fluctuation of the air-fuel ratio, when it is determined that the driving state of the engine 10 is not in the operating area of the feed-back control unit 46, the fluctuation suppression target value, which is the target value for suppressing the fluctuation of the engine 10, is set to operate the feed-back control unit 46 based on the fluctuation suppression target value.

For that reason, in the same manner as the first embodiment, since the fluctuation of the engine 10 is effectively suppressed, it is advantageous in performing the modulation of the air-fuel ratio without deteriorating the drivability of the vehicle.

Third Embodiment

Next, a third embodiment will be described with reference to FIGS. 9 and 10.

The third embodiment is a modified example of the first embodiment and is different from the first embodiment in that an engine 60 is a diesel engine.

For this reason, the third embodiment is different from the first embodiment in that the driving control parameter is the fuel injection amount, the specific configuration of the exhaust purification unit thereof is different from that of the first embodiment, and other configurations are almost the same as the first embodiment, so description below will focus mainly on the points different from the first embodiment.

Figure 9:
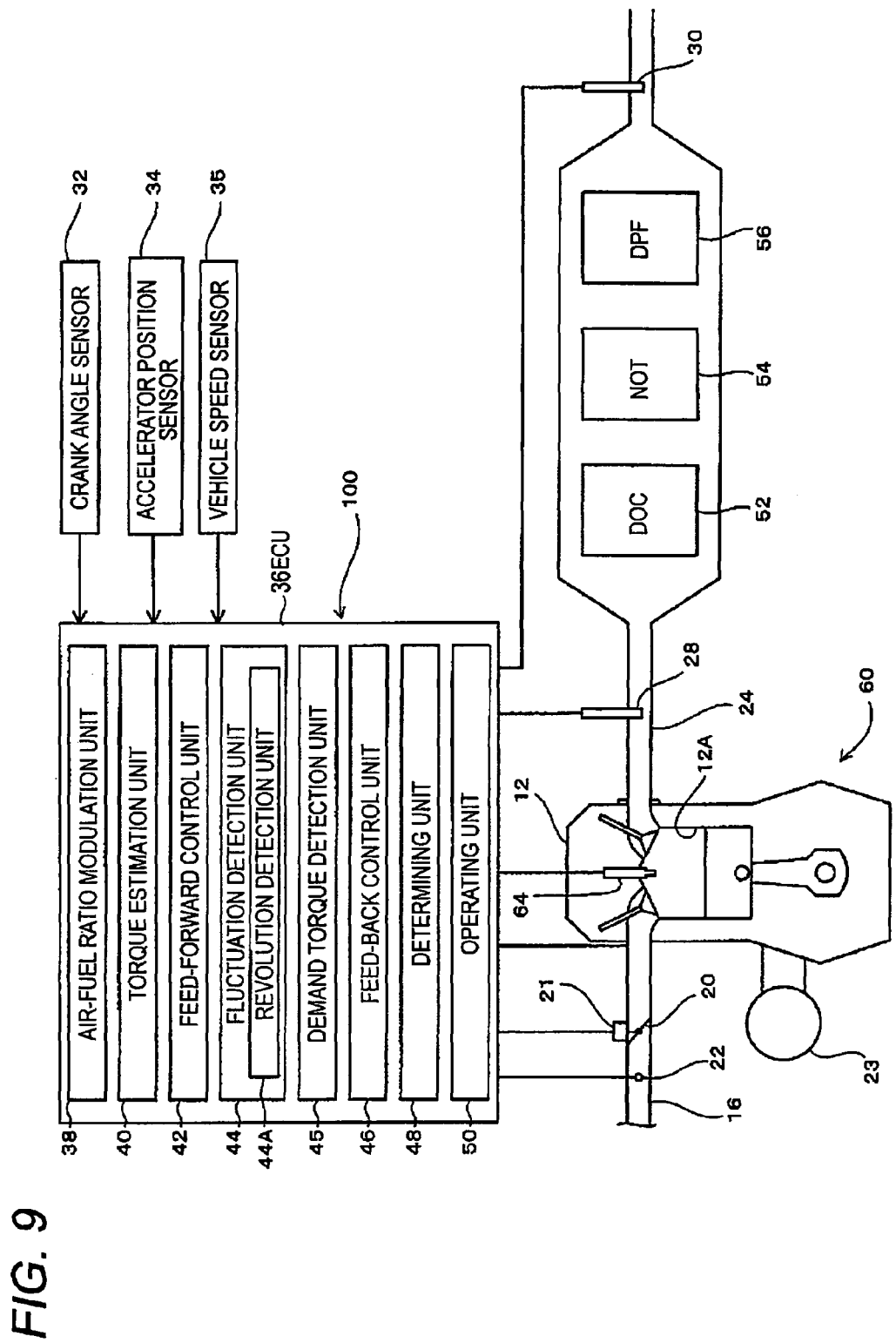
FIG. 9 is a diagram showing a configuration of an engine on which a control device in a third embodiment is provided.

As shown in FIG. 9, the engine 60 includes the cylinder head 12, the intake flow path 16, the throttle valve 20, and the air flow sensor 22.

On the cylinder head 12, a fuel injection valve 64 for injecting the fuel into the combustion chamber (the cylinder chamber) 12A is provided.

In the third embodiment, as the exhaust purification unit, an oxidation catalyst 52, a $NO_x$ storage catalyst 54, and a diesel particulate filter 56 are included.

The oxidation catalyst 52, the $NO_x$ storage catalyst 54, and the diesel particulate filter 56 are disposed in a row from the upstream side of the exhaust flow path 24 along the downstream side in this order. Furthermore, the arrangements of the $NO_x$ storage catalyst 54 and the diesel particulate filter 56 may be altered.

The oxidation catalyst 52 oxidizes CO and HC contained in the exhaust to be discharged from the engine 60 to decompose them into carbon dioxide and water.

For this reason, when the unburned gas is supplied, the unburned gas generates the oxidation reaction, so that the temperature of the oxidation catalyst 52 rises, and when the oxidation reaction of the unburned gas is finished, the temperature thereof drops.

That is, in order to raise the temperature of the oxidation catalyst 52, the unburned gas may be supplied to the oxidation catalyst 52 by modulating the air-fuel ratio in the engine 60, for example, performing the rich spike.

The $NO_x$ storage catalyst 54 occludes the $NO_x$ of the exhaust which is discharged from the engine 60.

The $NO_x$ storage catalyst 54 is formed, for example, by carrying a $NO_x$ occlusion agent such as barium (Ba) and kalium (K) in a carrier including precious metals such as platinum (Pt) and palladium (Pd).

The $NO_x$ storage catalyst 54 captures and occludes $NO_x$ under a lean air-fuel ratio atmosphere (an oxidation atmosphere). The $NO_x$ storage catalyst 54 discharges the captured $NO_x$ by being rich-purged under a rich air-fuel ratio atmosphere (a reduction atmosphere) to react with HC and CO in the exhaust and is reduced. That is, HC and CO in the exhaust are reducing agents.

That is, the $NO_x$ storage catalyst 54 is required to perform the reproduction of the function by performing the reduction processing.

In this case, in order to perform the rich purge, the air-fuel ratio may be modulated in the engine 60, for example, by performing the rich spike.

In addition, the $NO_x$ storage catalyst 54 has a property of occluding $SO_x$ (sulfur oxide), in which sulfur contained in the fuel is reacted with oxygen, instead of $NO_x$. For this reason, there is a problem in that, when the $NO_x$ storage catalyst 54 greatly occludes $SO_x$, eventually, the ability of occluding $NO_x$ declines, whereby the purification efficiency declines.

$SO_x$ occluded in the $NO_x$ storage catalyst 54 is combined with the $NO_x$ storage catalyst 54 in a more stable state compared to $NO_x$. Thus, when $SO_x$ is not set to be a higher temperature state than the temperature atmosphere at the time of rich purge, it is impossible to separate $SO_x$ from the $NO_x$ storage catalyst 54.

That is, since the $SO_x$ occluded in the $NO_x$ storage catalyst 54 cannot be removed by the rich purge, there is a need to remove $SO_x$ occluded in the $NO_x$ storage catalyst 54 by a method called a self purge.

The self purge is performed by setting the $NO_x$ storage catalyst 54 to be a high temperature atmosphere or the reduction atmosphere.

Specifically, the self purge forms the high temperature atmosphere by setting the temperature of the exhaust, which is supplied to the $NO_x$ storage catalyst 54, to be the high temperature. That is, the temperature of the exhaust from the oxidation catalyst 52 is raised by supplying CO and HC, in other words, the unburned gas to the oxidation catalyst 52 to form the high temperature atmosphere in the $NO_x$ storage catalyst 54.

Furthermore, the high temperature atmosphere or the reduction atmosphere is formed by supplying the unburned gas (reduction agent) to the $NO_x$ storage catalyst 54 to oxidize (burned) the unburned gas (reduction agent) with the $NO_x$ storage catalyst 54.

That is, in order to perform the self purge, the unburned gas may be supplied to the oxidation catalyst 52 to raise the exhaust temperature of the oxidation catalyst 52 by performing the rich spike to modulate the air-fuel ratio in the engine 60, and the unburned gas may be supplied to the $NO_x$ storage catalyst 54.

The diesel particulate filter 56 collects and removes the particulate matters contained in the exhaust.

Since there is a limit on the amount of the collectable particulate matters, the diesel particulate filter 56 needs to restore the function by removing the particulate matters converged in the diesel particulate filter 56.

Specifically, by supplying the unburned gas to the oxidation catalyst 52 and supplying the high temperature gas generated in the oxidation reaction to the diesel particulate filter 56, the particulate matters are burned. As a result, the function of the diesel particulate filter 56 is restored.

That is, in order to restore the diesel particulate filter 56, by modulating the air-fuel ratio in the engine 60, for example, performing the rich spike, the unburned gas may be supplied to the oxidation catalyst 52.

The above-mentioned air flow sensor 22, the crank angle sensor 32, the accelerator position sensor 34, the vehicle speed sensor 35, and various sensors (not shown) are connected to the input side of the ECU 36, and the detection information from the various sensors is input thereto.

Furthermore, the fuel injection valve 64 and various output devices (not shown) are connected to the output side of the ECU 36.

The CPU implements the control program, so that ECU 36 controls the fuel injection valve 64 and the above-mentioned various devices based on the detection information from the various sensors, whereby the control of the engine 60 is performed.

That is, the ECU 36 calculates the fuel injection amount, the fuel injection timing or the like based on the detection information from the air flow sensor 22 and the crank angle sensor 32. In addition, the ECU 36 controls the fuel injection valve 64 based on the calculation result.

As a result, the suitable amount of fuel is injected from the fuel injection valve 64 at a suitable timing, and the combustion of the mixed gas within the combustion chamber 12A is performed at a suitable timing.

The air-fuel ratio modulation unit 38 controls the air-fuel ratio of the engine 60 by controlling the fuel injection amount and the injection timing by the fuel injection valve 64.

In the present embodiment, the air-fuel ratio modulation unit 38 maintains the air-fuel ratio of the engine 60 to be lean (thin) when the situation is normal.

Furthermore, when there is a need to supply the unburned gas with respect to the oxidation catalyst 52 and the $NO_x$ storage catalyst 54, a compulsory modulation for compulsorily modulating the air-fuel ratio of the engine 60 is performed.

In addition, in the present embodiment, in order to promote the simplification of the description, as the compulsory modulation, a case of implementing the rich spike which intermittently makes the air-fuel ratio of the engine 60 rich will be described.

By performing the rich spike (the compulsory modulation), the unburned gas is supplied to the oxidation catalyst 52 and the $NO_x$ storage catalyst 54 as the exhaust purification unit.

As a result, the rich purge and the self purge of the above-mentioned $NO_x$ storage catalyst 54 and the reproduction processing of the diesel particulate filter 56 are performed.

In the same manner as the first embodiment, the feed-forward control unit 42 performs the feed-forward control of the driving control parameter of the engine 60 so as to suppress the torque fluctuation amount estimated with the torque estimation unit 68.

However, in the third embodiment, the feed-forward control unit 42 sets the fuel injection amount of the fuel injection valve 64 as the driving control parameter of the engine 60.

That is, the feed-forward control unit 42 suppresses the torque fluctuation amount of the engine 60 by controlling the fuel injection amount.

Furthermore, the driving control parameter, which is subjected to the feed-forward control with the feed-forward control unit 42, is not limited to the fuel injection amount, but, in the case of the diesel engine, the throttle opening degree of the throttle valve 20 as the driving control parameter may be used.

In the third embodiment, the feed-back control unit 46 sets the fuel injection amount of the fuel injection valve 64 as the driving control parameter of the engine 60.

Thus, the feed-back control unit 46 performs the feed-back control of the fuel injection amount of the fuel injection valve 64 so as to suppress the fluctuation amount of the revolution of the engine 60 detected with the fluctuation detection unit 44.

Next, the description will be given to the torque fluctuation suppressing processing during reproduction processing of the rich purge or the self purge of the $NO_x$ storage catalyst 54 or the reproduction processing of the diesel particulate filter 56 by the control device 100 with reference to the flow chart shown in FIG. 10.

Figure 10:
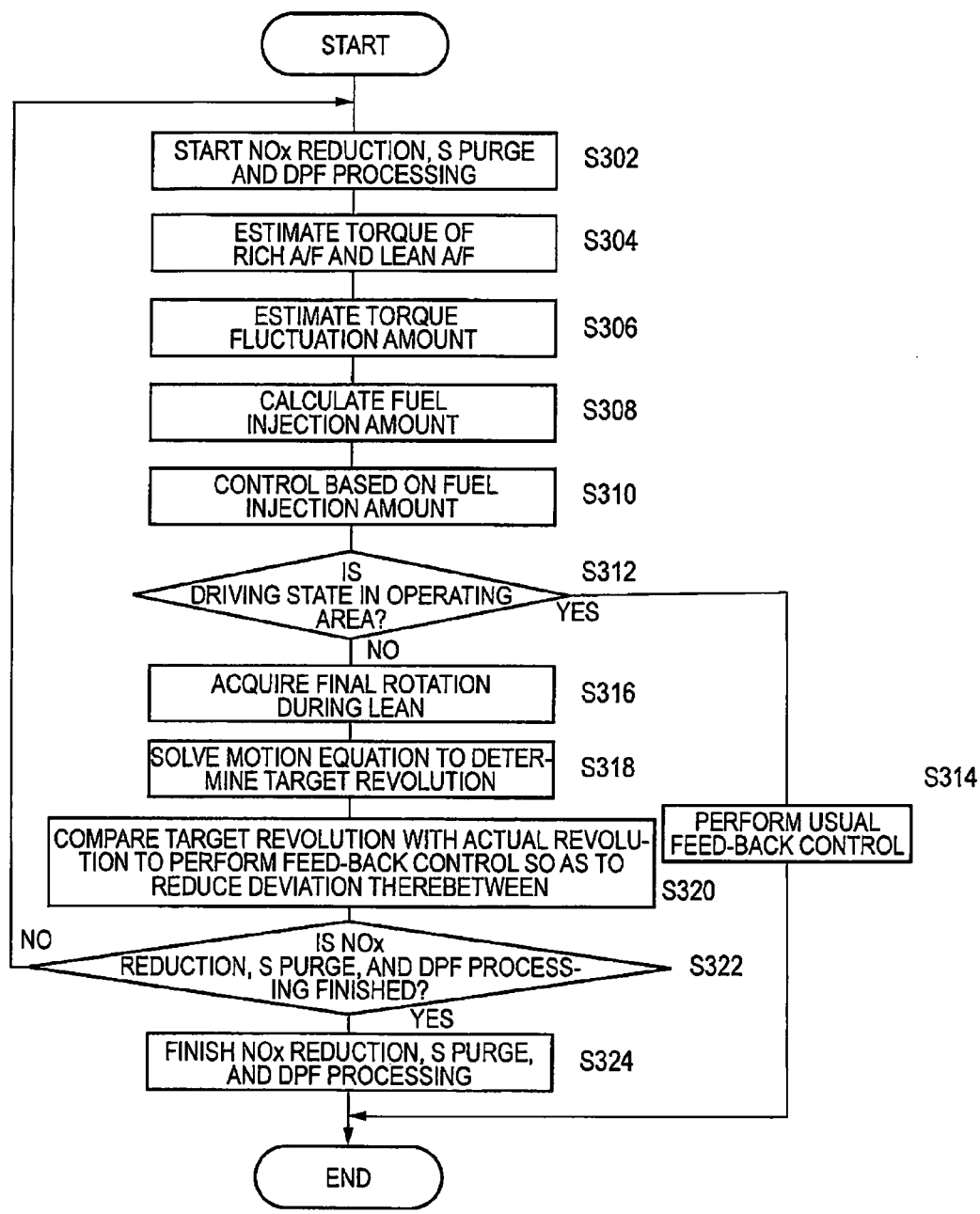
FIG. 10 is a flow chart showing a torque fluctuation suppressing processing when a rich purge or a self purge of $NO_x$ storage catalyst or a reproduction processing of a diesel particulate filter is performed by the control device in the third embodiment.

The operation in FIG. 10 is started by the need to perform the reproduction processing.

First of all, the ECU 36 implements the compulsory modulation of the air-fuel ratio by the air-fuel ratio modulation unit 38. That is, the air-fuel ratio modulation unit 38 begins the rich purge. That is, processing of any of the rich spike or the self purge of the $NO_x$ storage catalyst 54 or reproduction processing of the diesel particulate filter 56 starts (step S302).

Hereinafter, the operations of steps S304 to S320 are the same as those of the steps S104 to S120 in FIG. 4 except that the driving control parameter includes the fuel injection amount. Thus, the description thereof will be omitted.

After step S320 is implemented, the ECU 36 determines whether or not the rich purge or the self purge of the $NO_x$ storage catalyst 54 or the reproduction processing of the diesel particulate filter 56, in other words, the reproduction processing of the exhaust purification unit is finished (step S322).

Furthermore, in the same manner as the first embodiment, when the rich spike implementation period ΔTa is measured, the determination of whether or not the reproduction processing of the exhaust purification unit is finished can be performed based on whether or not the measured time reaches the prescribed and predetermined time.

If the step S322 is negative, the process returns to the step S302, and if the step S322 is positive, the implementation of the rich spike is finished. That is, the reproduction processing of the exhaust purification unit is finished (step S324), thereby finishing a series of processes.

The control device 100 of the third embodiment also exhibits the same effects as the first embodiment.

Fourth Embodiment

Next, a fourth embodiment will be described with reference to FIG. 11.

The fourth embodiment is a modified example of the second embodiment and is different from the second embodiment in that the engine 60 is constituted by the diesel engine.

For this reason, the fourth embodiment is different from the second embodiment in terms of the specific configuration of the exhaust purification unit in that the driving control parameter is the fuel injection amount and; otherwise, the configuration is substantially the same as that of the second embodiment.

Thus, hereinafter, the description will be made regarding the torque fluctuation suppressing processing during rich purge or self purge of the $NO_x$ storage catalyst 54 in the control device 100 or reproduction processing of the diesel particulate filter 56 with reference to the flow chart shown in FIG. 11.

Figure 11:
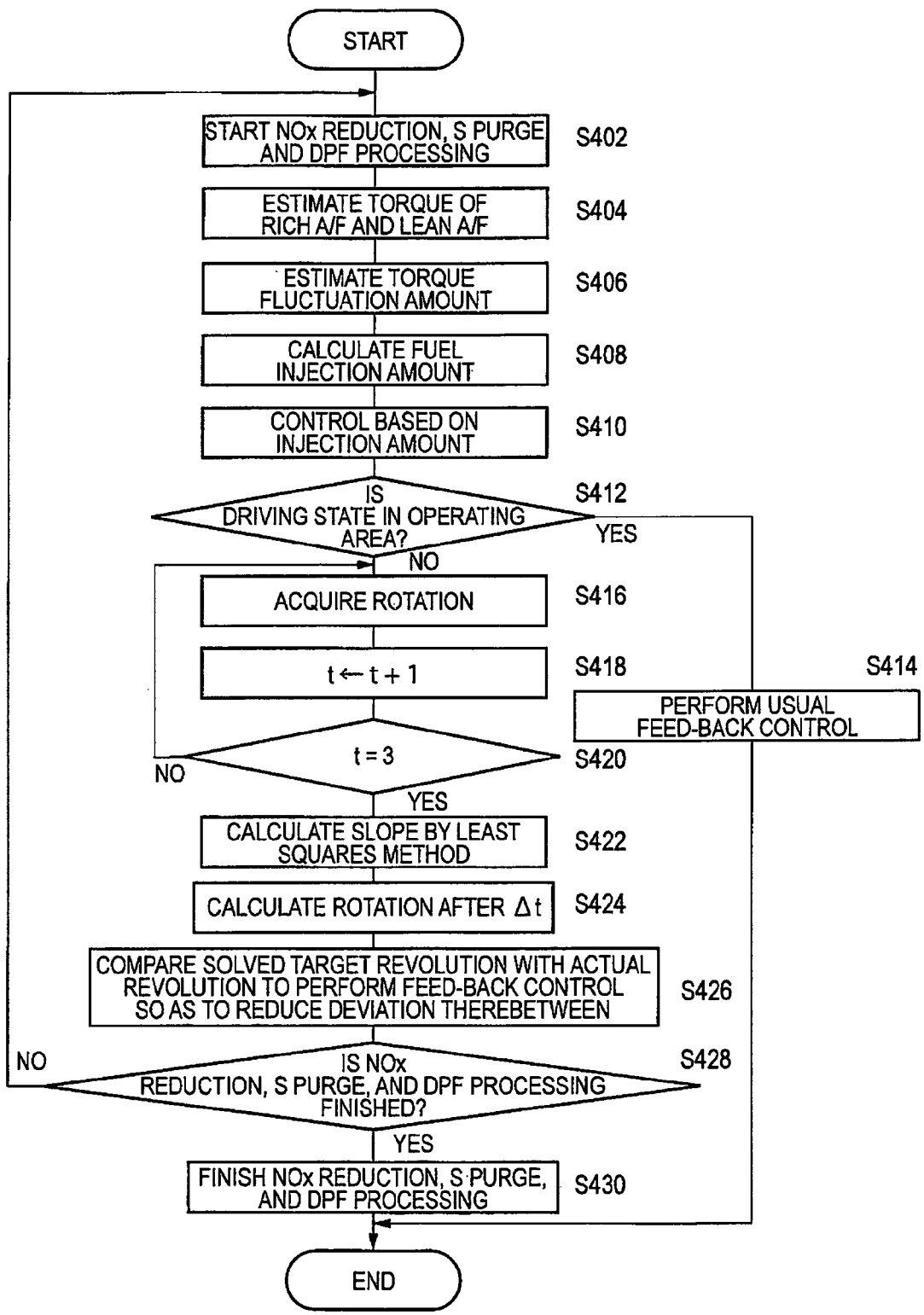
FIG. 11 is a flow chart showing a torque fluctuation suppressing processing when a rich purge or a self purge of $NO_x$ storage catalyst or a reproduction processing of a diesel particulate filter is performed by the control device in a fourth embodiment.

Steps S402 to S414 in FIG. 11 are the same as the steps S302 to S314 in FIG. 10 and steps S416 and S426 in FIG. 11 are the same as the steps S216 and S226 in FIG. 8. Thus, the description thereof will be omitted and the description will be given from step S428.

After the implementation of the step S426, the ECU 36 determines whether or not the rich purge or the self purge of the NO$_x$ storage catalyst 54 or the reproduction processing of the diesel particulate filter 56, in other words, the reproduction processing of the exhaust purification unit is finished (step S428).

If the step S428 is negative, the process returns to the step S402, and if the step S428 is positive, the implementation of the rich spike is finished. That is, the reproduction processing of the exhaust purification unit is finished (step S430), thereby finishing a series of processes.

The control device 100 of the fourth embodiment also exhibits the same effects as that of the second embodiment.

Fifth Embodiment

In the above-mentioned first to fourth embodiments, it has been described that the motor 23 shown in FIG. 1 or 9 is an alternator or a generator. However, in a fifth embodiment, the description will be made regarding a form in which the motor 23 is a component, which applies at least one of a positive torque or a negative torque to the engine 10, and mainly, the feed-back control means 46 of the control device 100 controls the revolution (the positive torque or the negative torque applied from the motor 23 to the engine 10) of the motor 23 as the driving control parameter.

A specific form of this kind of motor 23 can include an alternator, a generator or an electric motor.

In a case where the motor 23 is a general alternator, the motor acts as electric load to apply only the negative torque to the engine 10.

In a case where the motor 23 is a generator, the motor acts as an electric load in the same manner as the general alternator to apply a positive load or a negative load to the engine 10.

In a case where the motor 23 is an electric motor which is a driving source of a hybrid vehicle together with the engine 10, the motor applies the positive torque and the negative torque to the engine 10.

In the following description, mainly, it is described that the motor 23 can apply the positive torque and the negative torque to the engine 10.

The feed-back control unit 46 of the control device 100 sets the revolution (the positive torque or the negative torque applied from the motor 23 to the engine 10) of the motor 23 to be the driving control parameter and performs the feed-back control of the revolution of the motor 23 so as to suppress the fluctuation of the engine 10 detected with the fluctuation detection unit 44. The feed-back control unit 46 calculates the deviation of the target revolution and the actual revolution of the engine 10 to adjust the torque of the motor 23 which is necessary for reducing the deviation.

At this time, if (the target revolution)<(the actual revolution) of the engine 10, in order to apply the negative torque to the engine 10 to reduce the actual revolution, the revolution of the motor 23 is controlled so as to be further reduced. On the other hand, if (the target revolution)>(the actual revolution) of the engine 10, in order to apply the positive torque to the engine 10 so as to increase the actual revolution, the revolution of the motor 23 is controlled so as to be further increased.

The control corresponds to the step S120 in FIG. 4, the step S226 in FIG. 8, the step S320 in FIG. 10, and the step S426 in FIG. 11.

Additionally, the revolution of the motor 23 may be subjected to the feed-forward control with the feed-forward control unit 42 so as to suppress the torque fluctuation amount, which has been estimated with the torque estimation unit 40 of the control device 100, to suppress the torque fluctuation of the engine 10. At that time, the torque calculation of the motor 23 is a control which corresponds to the calculations (the step S108 and the step S208) of the retardation amount in the first and second embodiments and the calculations (the step S308 and the step S408) of the fuel amount in the third and fourth embodiments.

Furthermore, in the present embodiment, the descriptions have been made regarding the case where the exhaust purification unit is constituted by the three-way catalyst 26 or the case where the exhaust purification unit is constituted by the oxidation catalyst 52, the NO$_x$ storage catalyst 54 and the diesel particulate filter 56.

However, in the present embodiment, the exhaust purification unit is not limited to the present embodiment, but the kind and the number of the catalyst constituting the exhaust purification unit are arbitrary.

Furthermore, under the circumstance where the feed-back control unit is not in the operating area as described in the present embodiment, the method of setting the target value by the use of the motion equation or the least squares method and operating the feed-back control unit based on the target value can also be applied to the purpose of suppressing the same, even when not modulating the air-fuel ratio, in a case where the torque fluctuation may be generated in the engine (for example, when a vehicle air conditioner is turned ON so that a compressor is operated, when EGR is intermittently increased, or when the fuel injection method is switched, such as the switch over of an intake stroke injection and a compression stroke injection or the like).

In addition, in the present embodiment, the description has been given of the case of using the crank angle sensor 32 as the sensor for detecting the actual revolution of the engine 10. However, a cam angle sensor or the like can be used instead. Furthermore, the sensor is not limited to one detecting the actual revolution of the engine 10, but a sensor capable of detecting the actual torque of the engine 10 (and a vehicle with the same mounted thereon), for example, a torque sensor can also be used. In this case, the sensor detects the actual torque as the actual revolution and detects the target torque as the target revolution.

According to an aspect of the invention, during modulation of the air-fuel ratio, in a case where it is determined that the driving state of the internal combustion engine is not in the operating area of the feed-back control unit, the fluctuation suppression target value, which is the target value for suppressing the fluctuation of the internal combustion engine, is set to operate the feed-back control unit based on the fluctuation suppression target value.

As a result, since the fluctuation of the internal combustion engine is effectively suppressed, the modulation of the air-fuel ratio is performed without deteriorating the drivability of the vehicle, which is advantageous in securing the implementation frequency of the activation processing or the reproduction processing of the exhaust purification unit.

What is claimed is:

1. A control device of an internal combustion engine comprising:
an air-fuel ratio modulator, compulsorily performing modulation of an air-fuel ratio of an exhaust which flows in a three-way catalyst provided in an exhaust system of the internal combustion engine to activate the three-way catalyst;

a fluctuation detector, detecting a fluctuation of the internal combustion engine due to the modulation of the air-fuel ratio performed by the air-fuel ratio modulator;

a feed-back controller, performing feed-back control of a driving control parameter of the internal combustion engine so as to suppress the fluctuation detected by the fluctuation detector;

a determiner, determining whether or not a driving state of the internal combustion engine is in an operating area of the feed-back controller; and an operator, setting a target revolution of the internal combustion engine, which is a target value for suppressing the fluctuation of the internal combustion engine, to operate the feed-back controller based on the target value, when the determiner determines that the driving state of the internal combustion engine is not in the operating area of the feed-back controller, while the air-fuel modulator performs the modulation of the air-fuel ratio.

2. The control device of the internal combustion engine according to claim 1, wherein
the operator detects the target revolution of the internal combustion engine based on a motion equation which sets a crank angular speed or a crank angular acceleration of the internal combustion engine as an unknown function, and operates the feed-back controller so as to make an actual revolution close to the target revolution.

3. The control device of the internal combustion engine according to claim 1, wherein
the fluctuation detector includes a revolution detector detecting an actual revolution of the internal combustion engine, and
the operator detects the target revolution of the internal combustion engine based on least squares method which uses detection result by the revolution detector, and operates the feed-back controller so as to make the actual revolution close to the target revolution.

4. The control device of the internal combustion engine according to claim 1, wherein
the feed-back controller sets an ignition timing of the internal combustion engine to be the driving control parameter, and
the operator adjusts the ignition timing so as to reduce a deviation between a target revolution of the internal combustion engine and an actual revolution of the internal combustion engine.

5. The control device of the internal combustion engine according to claim 1, wherein
the feed-back controller sets a throttle opening degree of a throttle valve of the internal combustion engine to be the driving control parameter, and
the operator adjusts the throttle opening degree so as to reduce a deviation between a target revolution of the internal combustion engine and an actual revolution of the internal combustion engine.

6. The control device of the internal combustion engine according to claim 1, wherein
the feed-back controller sets a fuel injection amount of the internal combustion engine to be the driving control parameter, and
the operator adjusts the fuel injection amount so as to reduce a deviation between a target revolution of the internal combustion engine and an actual revolution of the internal combustion engine.

7. The control device of the internal combustion engine according to claim 1, wherein
the feed-back controller sets a fuel injection timing of the internal combustion engine to be the driving control parameter, and
the operator adjusts the fuel injection timing so as to reduce a deviation between a target revolution of the internal combustion engine and an actual revolution of the internal combustion engine.

8. The control device of the internal combustion engine according to claim 1, further comprising:
a motor, applying a positive torque or a negative torque to the internal combustion engine, wherein
the feed-back controller sets a revolution of the motor to be the driving control parameter, and
the operator adjusts the revolution of the motor so as to reduce a deviation between a target revolution of the internal combustion engine and an actual revolution of the internal combustion engine.

9. The control device of the internal combustion engine according to claim 1, wherein
when the internal combustion engine is in an acceleration driving state, the determiner determines that the driving state of the internal combustion engine is not in the operating area of the feed-back controller.

10. The control device of the internal combustion engine according to claim 1, wherein
when the internal combustion engine is in a normal driving state after acceleration, the determiner determines that the driving state of the internal combustion engine is not in the operating area of the feed-back controller.

11. The control device of the internal combustion engine according to claim 1, wherein
when the internal combustion engine is in a normal driving state after deceleration, the determiner determines that the driving state of the internal combustion engine is not in the operating area of the feed-back controller.

* * * * *